United States Patent
Kobayashi

(10) Patent No.: US 8,830,684 B2
(45) Date of Patent: Sep. 9, 2014

(54) CABLE STORAGE STRUCTURE OF SLIDE COMPONENTS, SLIDE UNIT, ELECTRONIC DEVICE, AND CABLE STORAGE METHOD

(75) Inventor: Fumiyuki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 304 days.

(21) Appl. No.: 13/148,838

(22) PCT Filed: Feb. 15, 2010

(86) PCT No.: PCT/JP2010/052572
§ 371 (c)(1),
(2), (4) Date: Aug. 10, 2011

(87) PCT Pub. No.: WO2010/098267
PCT Pub. Date: Sep. 2, 2010

(65) Prior Publication Data
US 2011/0308852 A1 Dec. 22, 2011

(30) Foreign Application Priority Data

Feb. 25, 2009 (JP) .................................. 2009-042967
Apr. 16, 2009 (JP) .................................. 2009-100385

(51) Int. Cl.
*H05K 1/00* (2006.01)
*H04M 1/02* (2006.01)
*H04M 1/15* (2006.01)

(52) U.S. Cl.
CPC .............. *H04M 1/0237* (2013.01); *H04M 1/15* (2013.01); *H04M 1/0274* (2013.01)
USPC ....................... 361/749; 455/575.4

(58) Field of Classification Search
USPC ............ 361/727–730, 741, 756, 802, 679.39, 361/749
See application file for complete search history.

(56) References Cited

U.S. PATENT DOCUMENTS 7,596,396 B2 * 9/2009 Fagrenius et al. .......... 455/575.4
8,218,758 B2 * 7/2012 Chen ........................ 379/433.12
(Continued)

FOREIGN PATENT DOCUMENTS

| CN | 1761269 A | 4/2006 |
|---|---|---|
| CN | 101150938 A | 3/2008 |

(Continued)

OTHER PUBLICATIONS

European search report for EP10746148.5 mailed on Oct. 10, 2012.
(Continued)

*Primary Examiner* — Hung S Bui
(74) *Attorney, Agent, or Firm* — Sughrue Mion, PLLC

(57) ABSTRACT

A slide groove (27) is formed between opposed surfaces of an operation component case (11) and a display component case (12) coupled to each other so as to be slidable relative to each other. The slide groove (27) extends in single-layer space parallel to the opposed surfaces and is capable of storing a bundle of ultrafine coaxial cables (33). The slide groove extends portions of the ultrafine coaxial cables that have been drawn from cable holes (24, 28) opened in the opposed surfaces along the same sliding direction and stores the ultrafine coaxial cables in a state in which the ultrafine coaxial cables are curved in a plane direction between the opposed surfaces. The cable holes are opened at positions separated in the sliding direction at the beginning of sliding and at the end of sliding.

31 Claims, 23 Drawing Sheets

(56) References Cited

U.S. PATENT DOCUMENTS

| | | | |
|---|---|---|---|
| 8,265,715 B2 * | 9/2012 | Komiyama | 455/575.1 |
| 8,346,323 B2 * | 1/2013 | Morita | 455/575.4 |
| 8,423,097 B2 * | 4/2013 | Takagi | 455/575.4 |
| 8,570,756 B2 * | 10/2013 | Sakai et al. | 361/752 |
| 2002/0132633 A1 * | 9/2002 | Johnson et al. | 455/550 |
| 2006/0114646 A1 | 6/2006 | Koibuchi et al. | |
| 2007/0275774 A1 | 11/2007 | Fagrenius et al. | |

FOREIGN PATENT DOCUMENTS

| | | |
|---|---|---|
| CN | 101242720 A | 8/2008 |
| CN | 101277322 A | 10/2008 |
| JP | S52-106494 A | 9/1977 |
| JP | 200/171443 A | 6/2001 |
| JP | 2004222173 A | 8/2004 |
| JP | 2006333573 A | 12/2006 |
| JP | 2008078471 A | 4/2008 |
| JP | 2008131544 A | 6/2008 |
| JP | 2008148248 A | 6/2008 |
| JP | 2008196525 A | 8/2008 |
| JP | 2008218389 A | 9/2008 |
| JP | 2008244542 A | 10/2008 |
| JP | 2009017377 A | 1/2009 |
| WO | 2006095382 A | 9/2006 |

OTHER PUBLICATIONS

Chinese Office Action for CN Application No. 201080009446.0 dated on Sep. 9, 2013 with English Translation.

Japanese Office Action for JP Application No. 2011-501574 mailed on Oct. 23, 2013 with English Translation.

International Search Report for PCT/JP2010/052572 mailed May 11, 2010.

Office Action dated Apr. 18, 2014, issued by the State Intellectual Property Office of the P.R.C. in corresponding Chinese Application No. 201080009446.0.

* cited by examiner

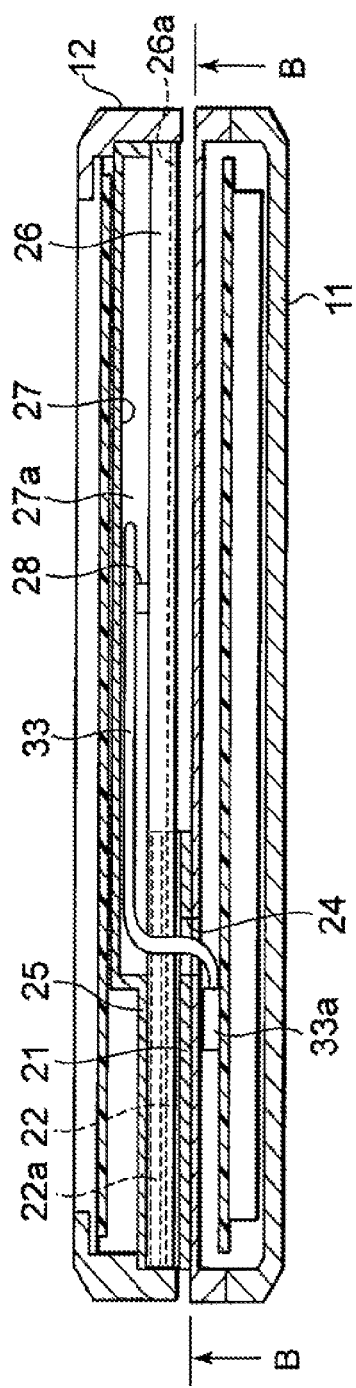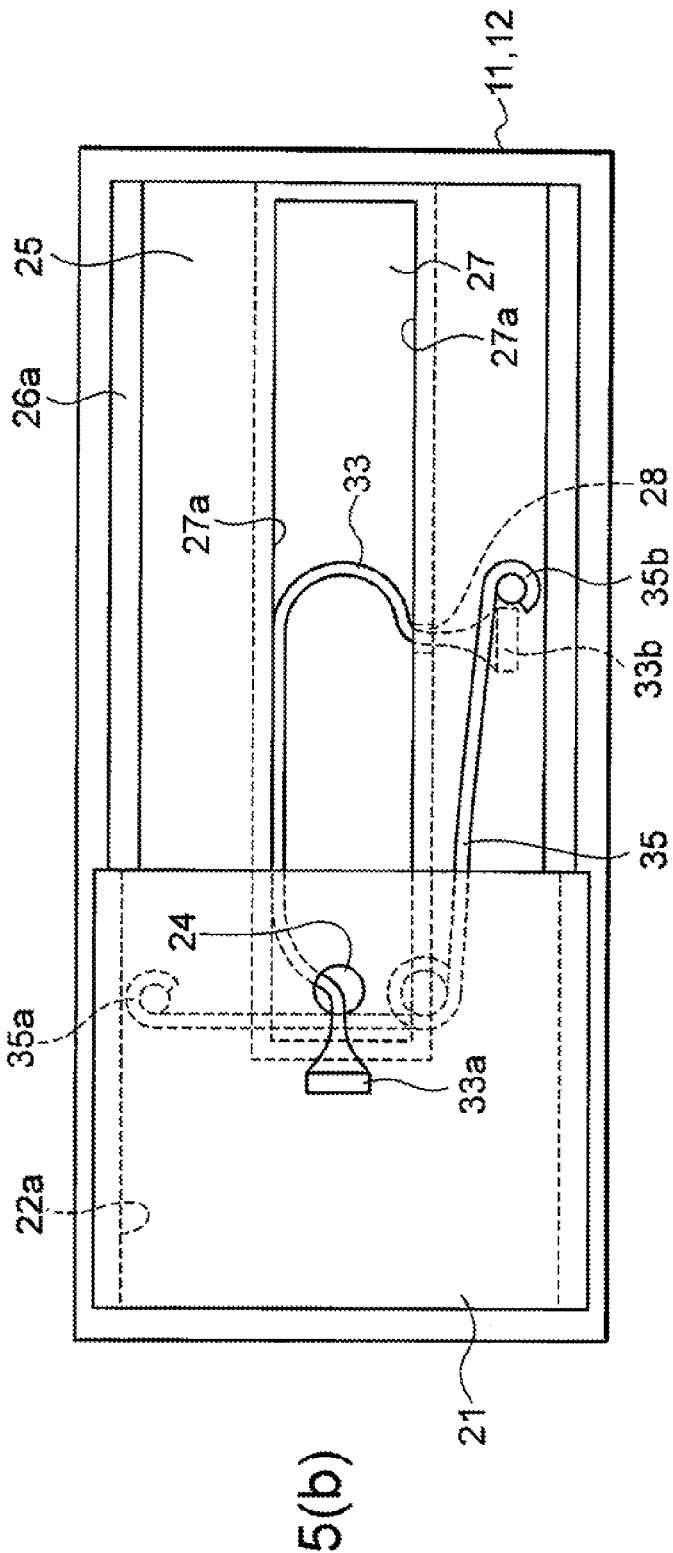
FIG. 5(a)
FIG. 5(b)

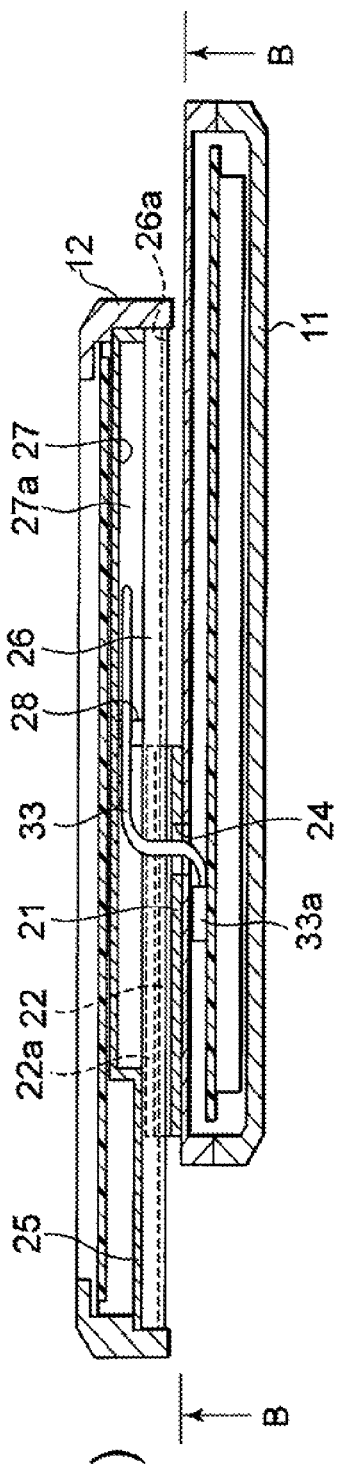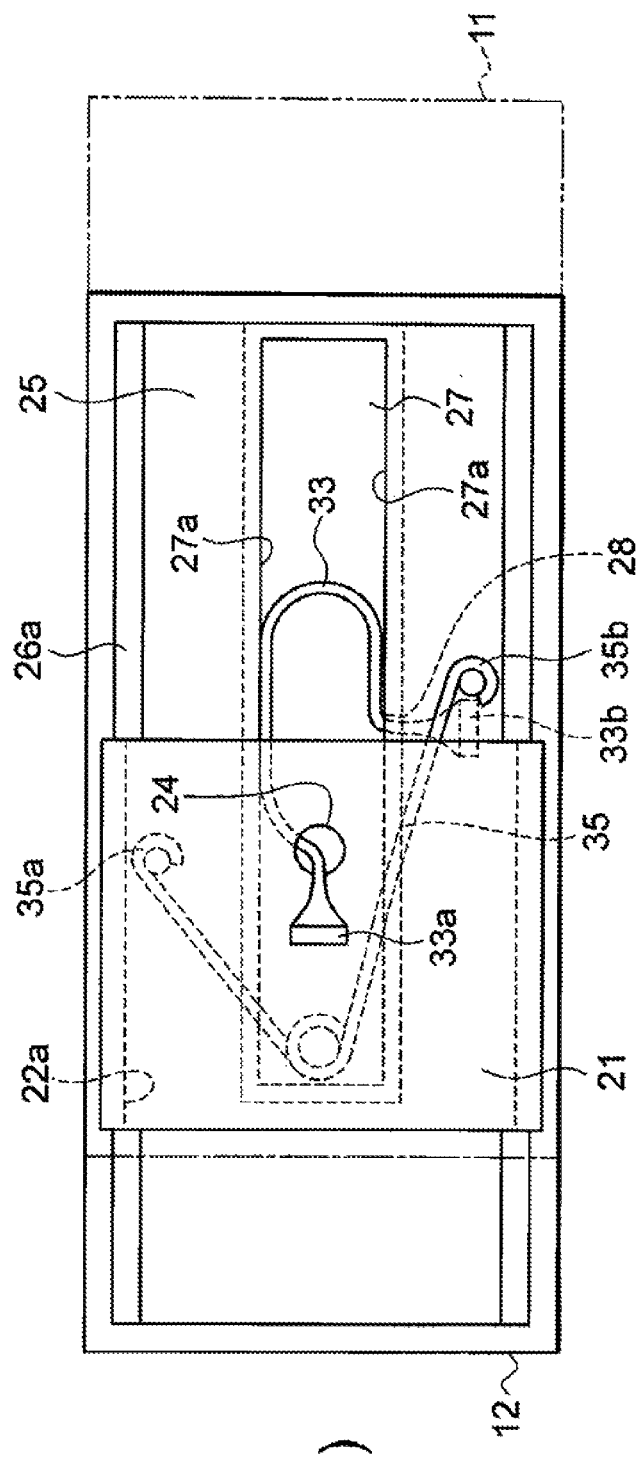
FIG. 6(a)
FIG. 6(b)

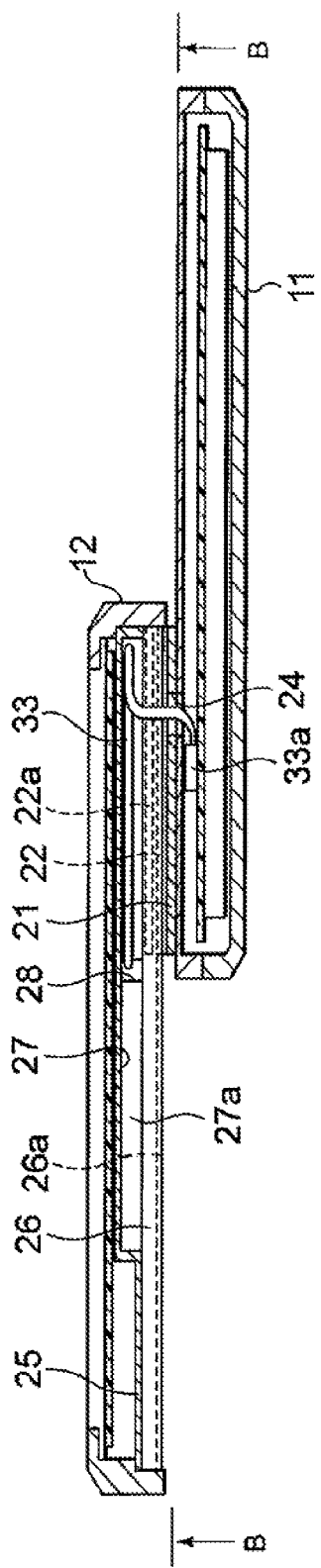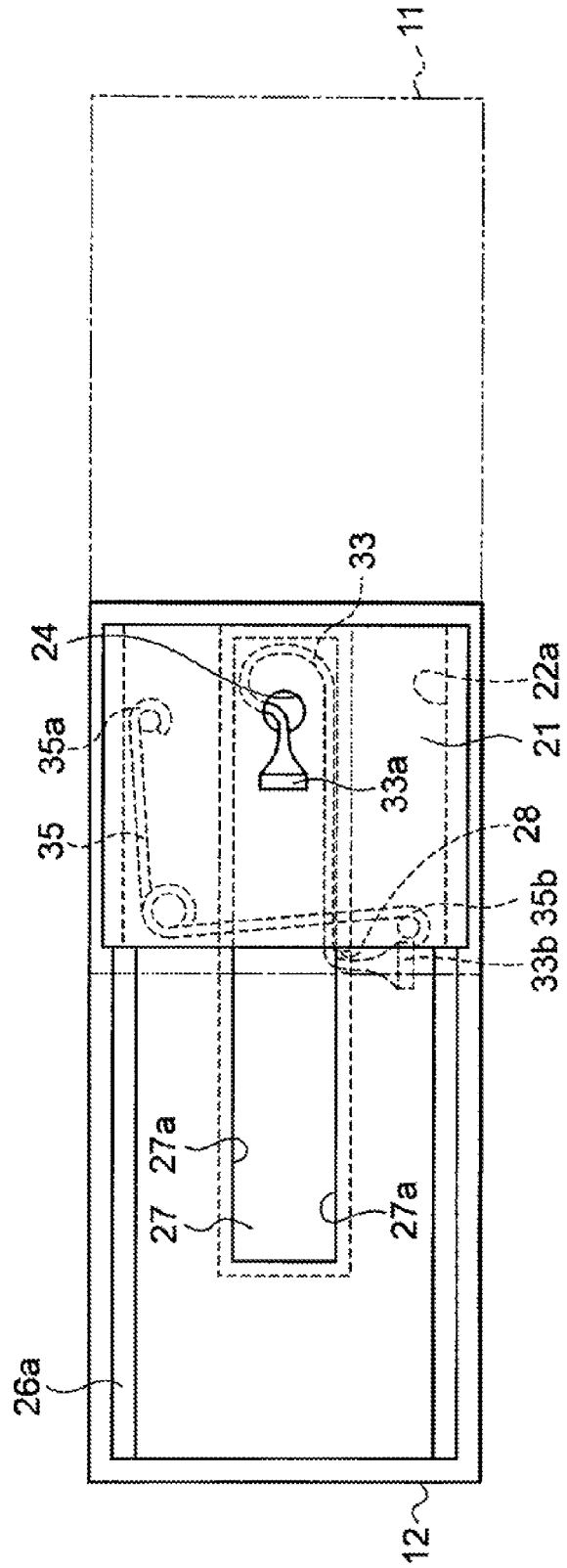

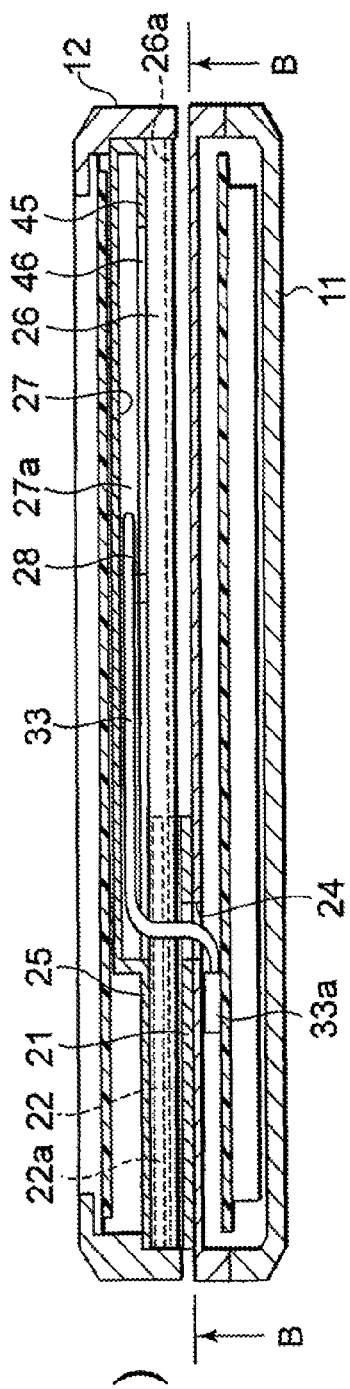
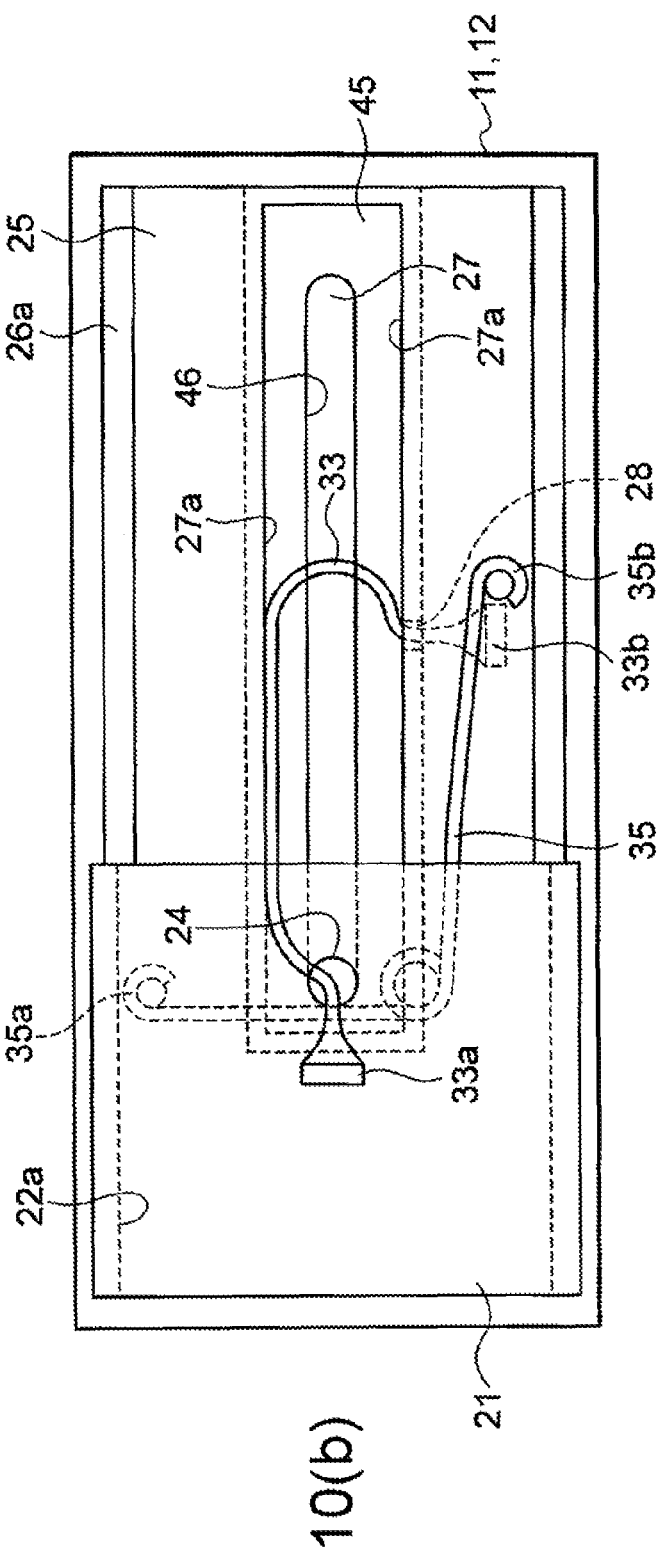
FIG. 10(a)
FIG. 10(b)

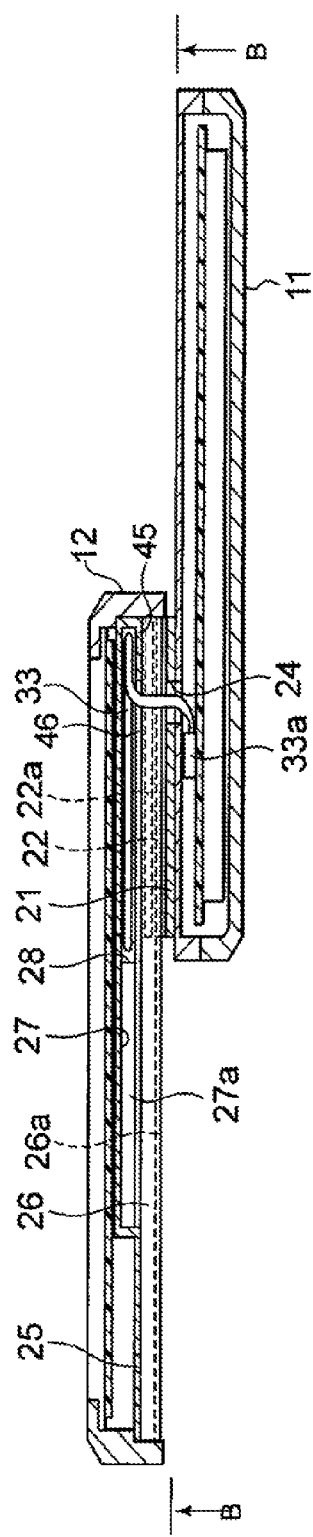
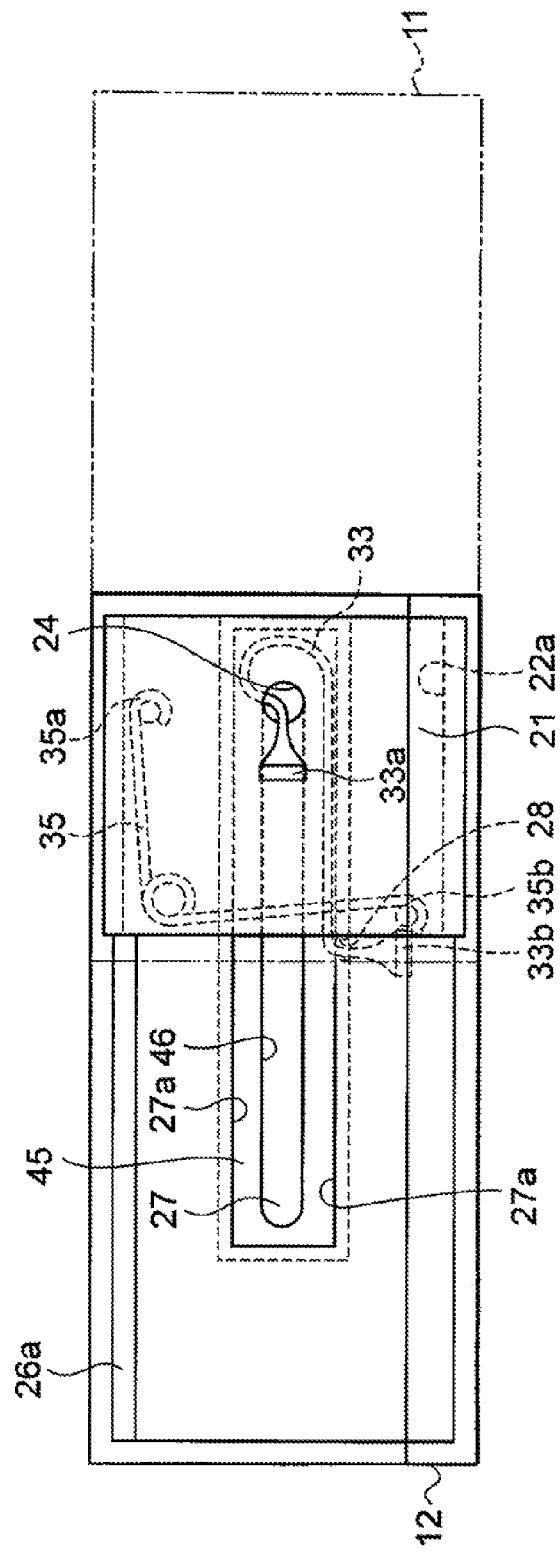

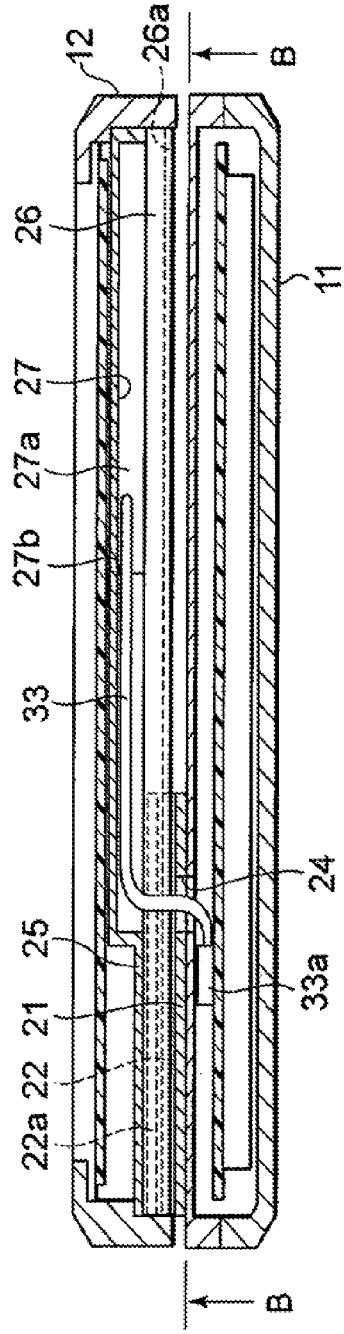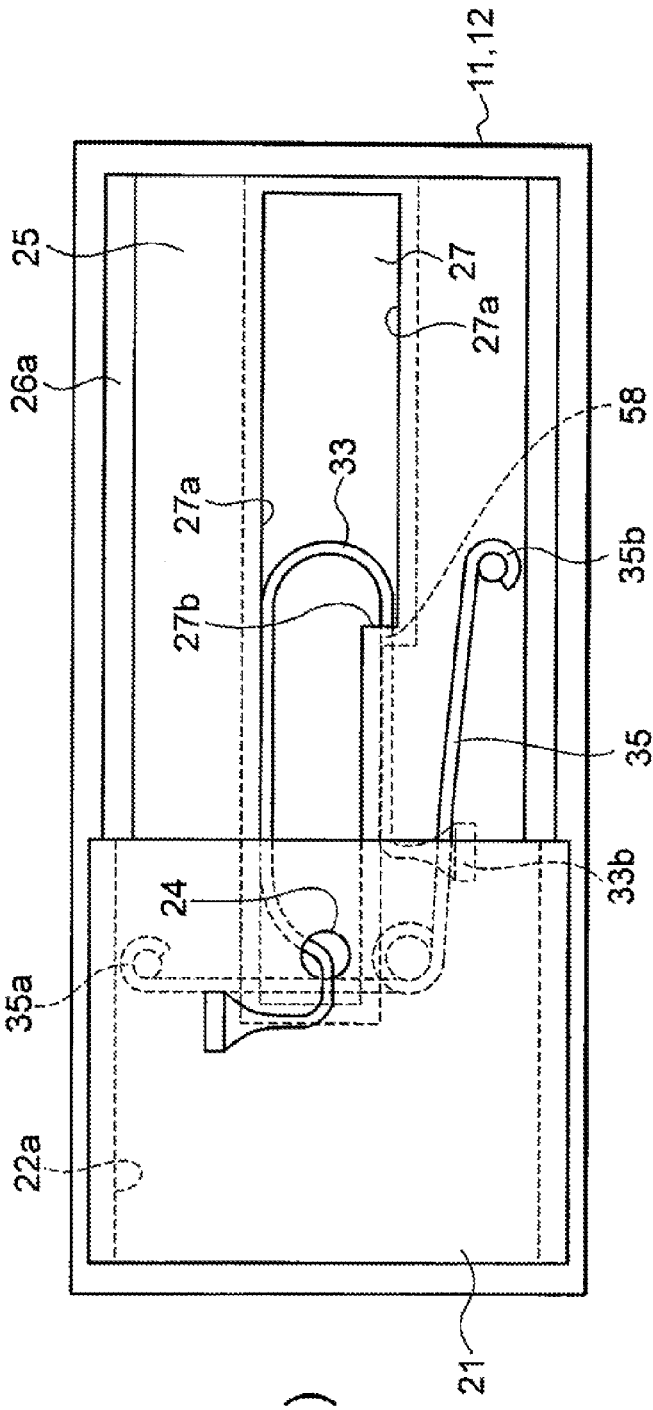
FIG. 13(a)
FIG. 13(b)

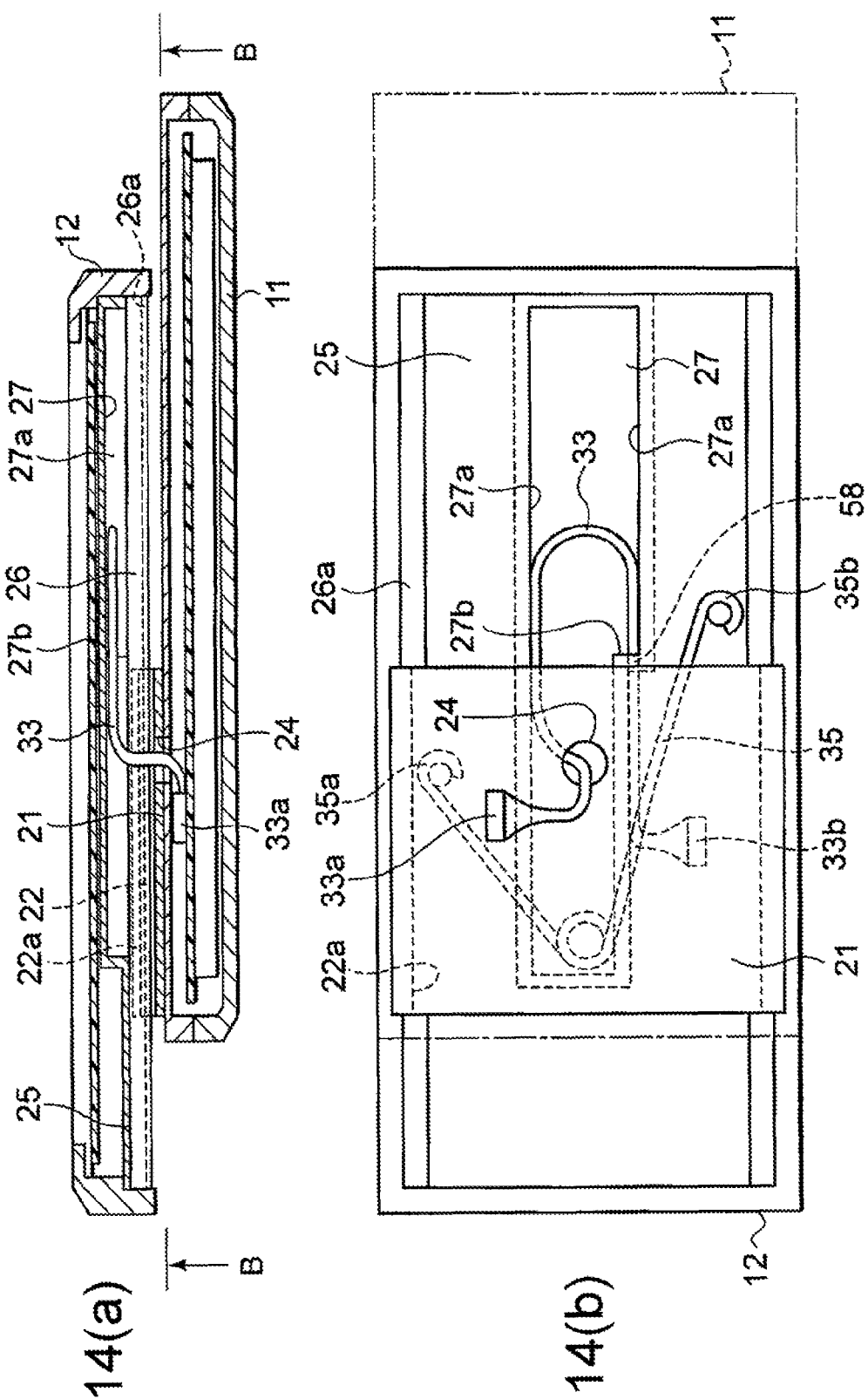

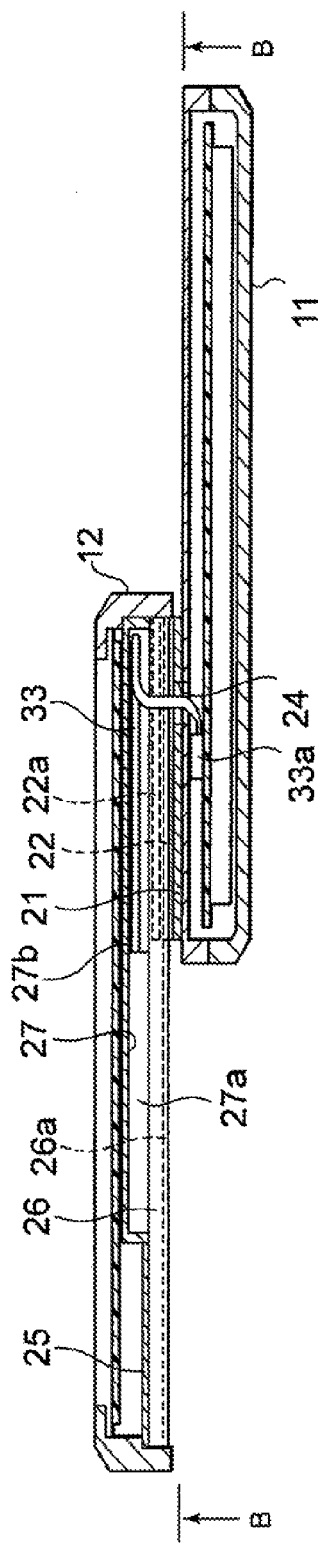
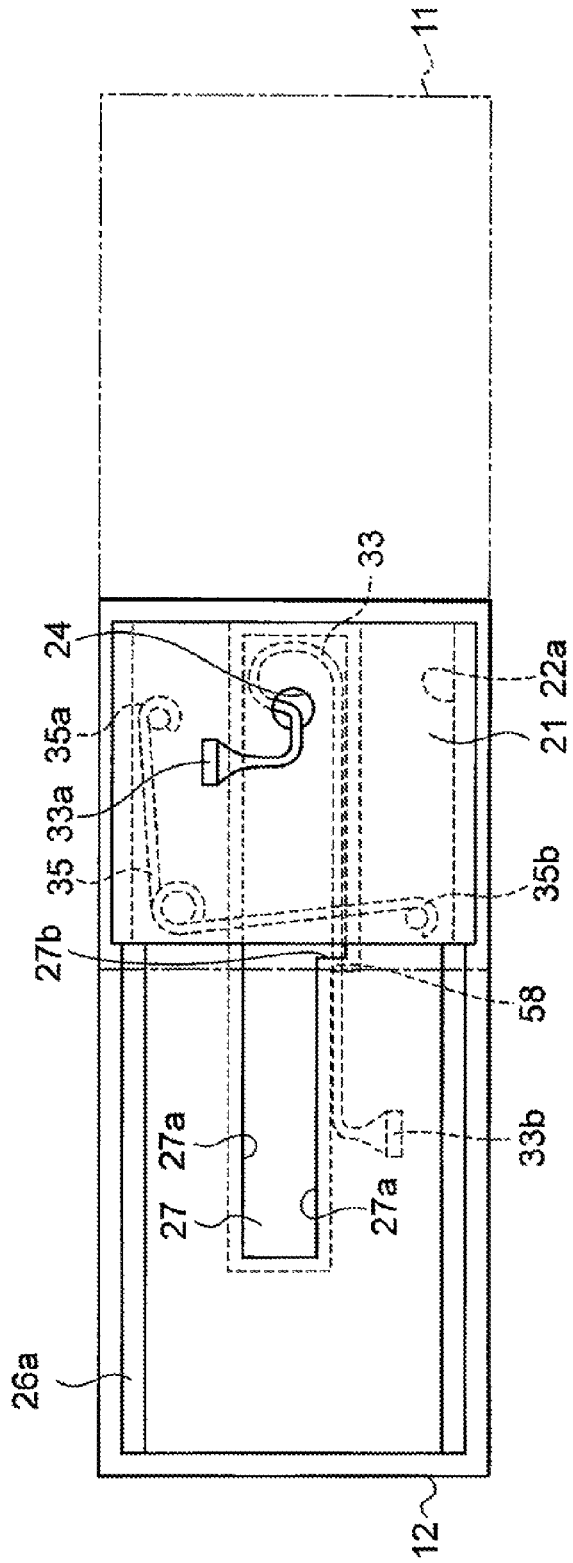

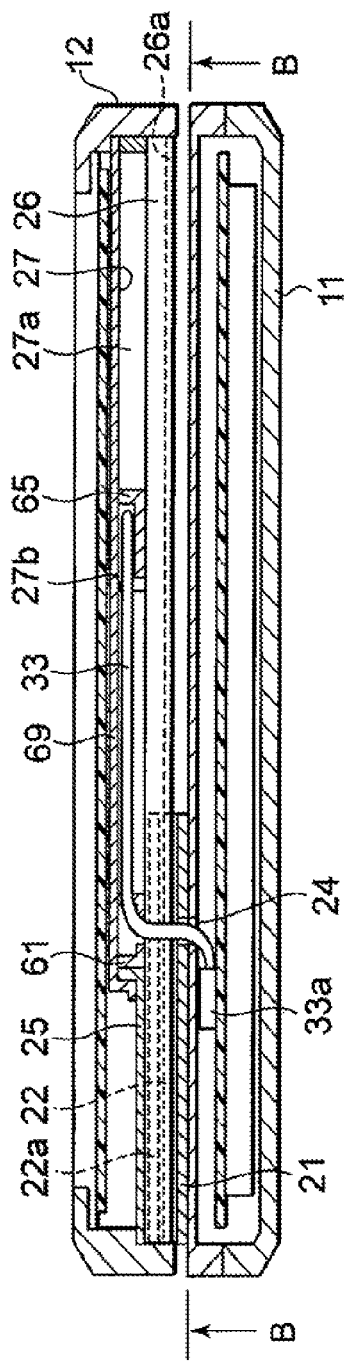
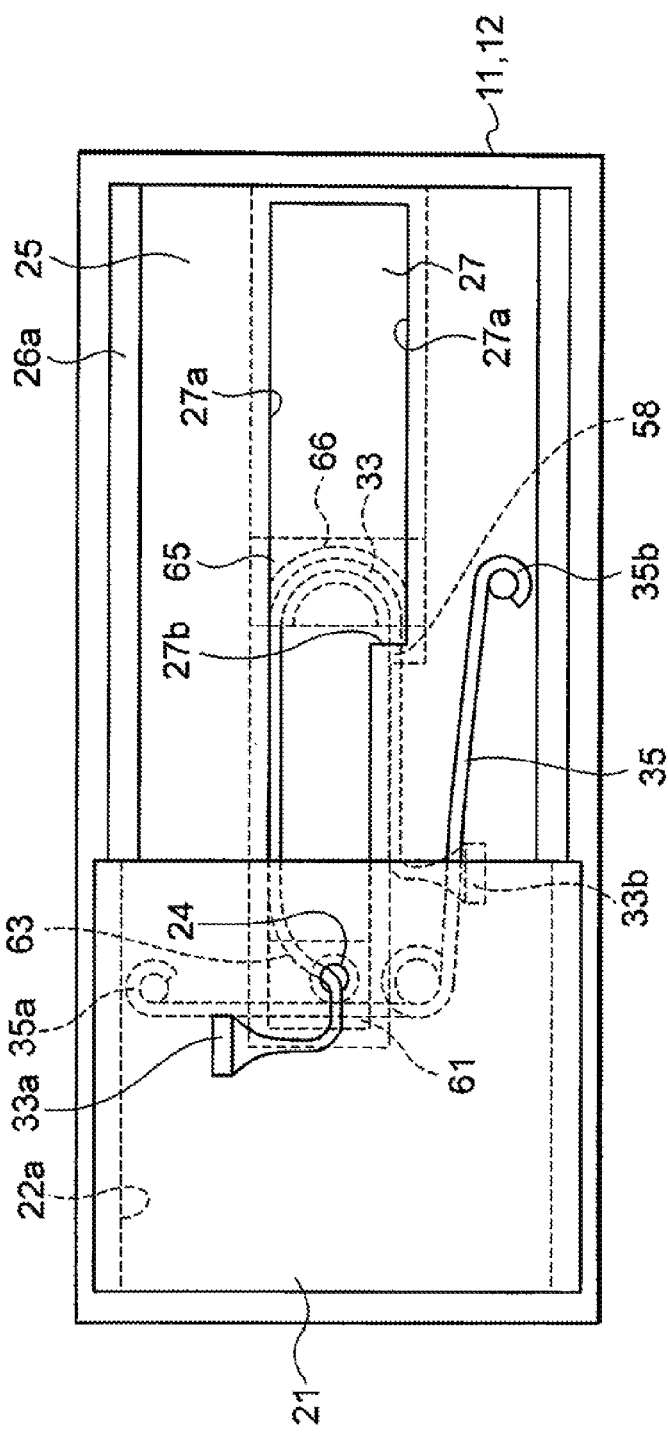
FIG. 21(a)
FIG. 21(b)

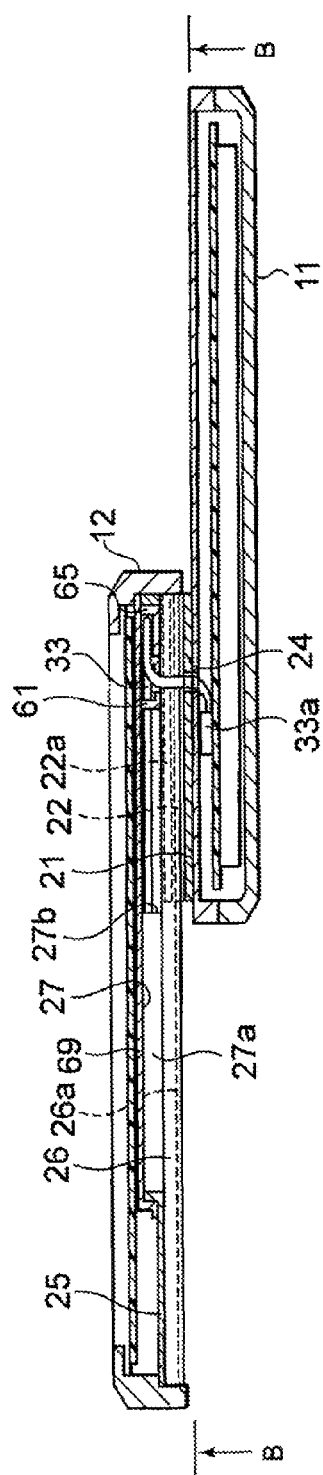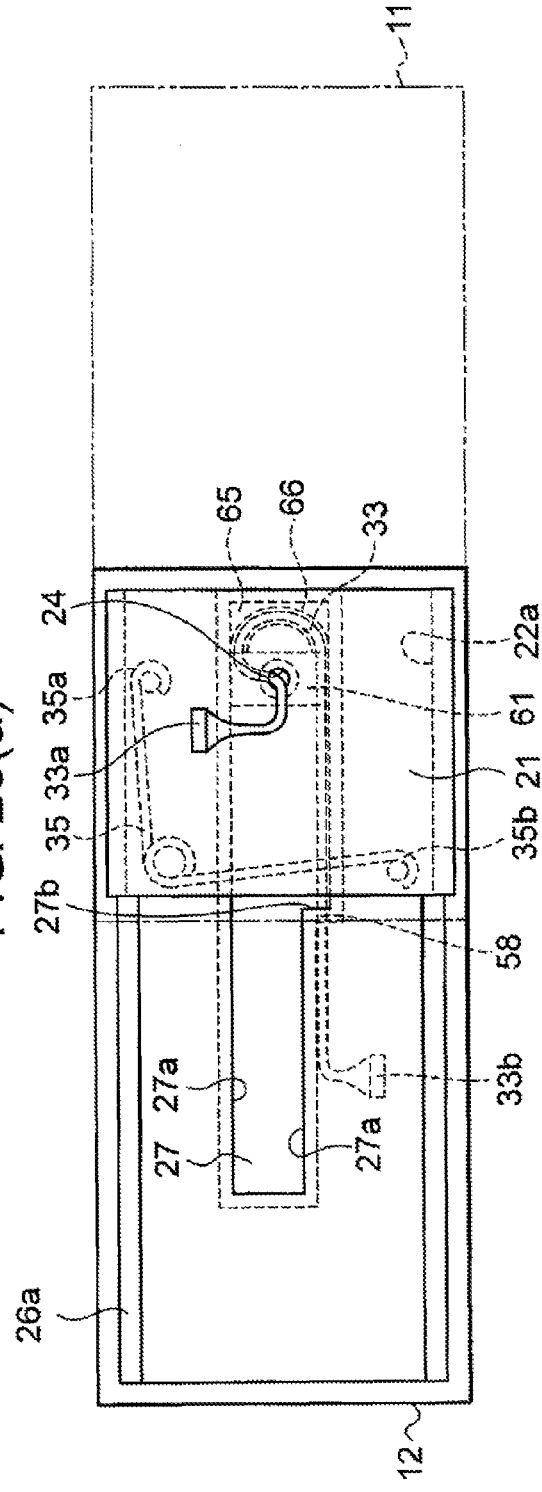

CABLE STORAGE STRUCTURE OF SLIDE COMPONENTS, SLIDE UNIT, ELECTRONIC DEVICE, AND CABLE STORAGE METHOD

TECHNICAL FIELD

The present invention relates to a cable storage structure of slide components, a slide unit, an electronic device, and a cable storage method.

BACKGROUND ART

Recent electronic devices have always been required to have a high efficiency and advanced functions and have also been desired to be miniaturized. Various kinds of technology have been developed for cellular phones and PHS (Personal Handyphone Systems) in particular.

For example, some cellular phones adopt a configuration in which an external shape changes between a standby mode and a use mode. In a case of what is called a clamshell type cellular phone, a receiver component having a display part and a microphone component having an operation part are opposed to each other and folded together in a standby mode. In a use mode, the receiver component and the microphone component are separated from each other so as to change into an elongated form. Furthermore, some cellular phones adopt what is called a slide type in which a receiver component and a microphone component are slidable. In the case of a slide type cellular phone, a receiver component and a microphone component are superimposed on each other in a standby mode. In a use mode, the receiver component and the microphone component are slid with respect to each other so as to change into an elongated form.

In either type of a clamshell type or a slide type, a flexible printed wiring board is generally used as a connection conductor (harness) for electrically connecting between internal circuit boards of a receiver component and a microphone component. Since a flexible printed wiring board has a structure in the form of a thin plate, it has excellent characteristics for reduction of a bend radius (the minimum bend radius is about 1 mm) and excellent resistance to repeated bending. Thus, a flexible printed wiring board is suitable to reduce the thickness of a product.

Particularly, if a clamshell type is selected, use of coaxial cables has been proposed to improve the transmission characteristics of signals and to avoid interference with other parts and influence from a disturbance (see Patent Document 1: JP-A 2006-333573).

Meanwhile, if a slide type is selected, circuit boards in a receiver component and a microphone component should be connected to each other with the receiver component and the microphone component being moved in a state in which a connection conductor is bent in a narrow clearance (see Patent Document 2: JP-A 2004-222173, Patent Document 3: International Publication WO2006-095382, and Patent Document 4: JP-A 2008-148248). Therefore, a flexible printed wiring board cannot entirely be replaced with coaxial cables.

Accordingly, there has been proposed that a shield is provided on a flexible printed wiring board that connects between circuit boards in a receiver component and a microphone component in order to avoid interference with other parts and influence from a disturbance when a slide type is selected (see Patent Document 5: JP-A 2008-131544).

Furthermore, use of the latest ultrafine coaxial cables has been proposed to connect between circuit boards in a receiver component and a microphone component when a slide type is selected (Patent Document 6: JP-A 2008-218389).

DISCLOSURE OF THE INVENTION

Problem(s) to be Solved by the Invention

However, with the structure disclosed in Patent Document 5, the shield provided on the flexible printed wiring board restricts the layout of constituent parts and lowers the flexibility of design. Furthermore, an increase of the thickness of the components cannot be avoided effectively, so that miniaturization of products is inhibited. Particularly, a storage space for the flexible printed wiring board is required in both of the receiver component and the microphone component in order to permit deformation of the flexible printed wiring board according to sliding of the receiver component and the microphone component. Such a storage space causes an increase of the thickness of the components.

Moreover, with the structure disclosed in Patent Document 6, a storage space for ultrafine coaxial cables is required in each of the receiver component and the microphone component, resulting in an increase of the thickness of the components. Particularly, because a flat cable is freely deformable, other constituent parts cannot be disposed within the storage space. Thus, the thickness of the components is further increased.

It is, therefore, an object of the present invention to provide any one of a cable storage structure of slide components, a slide unit, an electronic device, and a cable storage method that solve any one of the aforementioned problems.

Means for Solving the Problem(s)

A cable storage structure of slide components according to an embodiment of the present invention has a cable storage portion formed between opposed surfaces of a first component and a second component coupled to each other so as to be slidable relative to each other. The cable storage portion extends in a single-layer space parallel to the opposed surfaces and is capable of storing a given cable. The cable storage portion extends portions of the cable drawn from cable holes opened in the respective opposed surfaces along the same sliding direction and stores the cable in a state in which the cable is curved in a plane direction between the opposed surfaces.

A slide unit according to an embodiment of the present invention has a first component and a second component coupled to each other so as to be slidable relative to each other. A cable storage portion is formed between opposed surfaces of the first component and the second component so as to extend in a single-layer space parallel to the opposed surfaces and to be capable of storing a given cable. The cable storage portion extends portions of the cable that have been drawn from cable holes opened in the respective opposed surfaces along the same sliding direction and stores the cable in a state in which the cable is curved in a plane direction between the opposed surfaces.

An electronic device according to an embodiment of the present invention has a first component and a second component coupled to each other so as to be slidable relative to each other. The first component and the second component store circuit boards that are conductively connected via a cable. A cable storage portion is formed between opposed surfaces of the first component and the second component so as to extend in a single-layer space parallel to the opposed surfaces and to be capable of storing the cable. The cable storage portion extends portions of the cable that have been drawn from cable holes opened in the respective opposed surfaces along the same sliding direction and stores the cable in a state in which the cable is curved in a plane direction between the opposed surfaces.

A cable storage method according to an embodiment of the present invention includes forming a cable storage portion formed between opposed surfaces of a first component and a second component coupled to each other so as to be slidable relative to each other. The cable storage portion extends in a single-layer space parallel to the opposed surfaces and is capable of storing a given cable. The cable storage method includes drawing the cable from cable holes opened in the respective opposed surfaces, extending portions of the cable along the same sliding direction, and curving the cable in a plane direction between the opposed surfaces.

Effect(s) of the Invention

According to an embodiment of the present invention, there can be provided any one of a cable storage structure of slide components, a slide unit, an electronic device, and a cable storage method that solve any one of the problems described in Problem(s) to be Solved by the Invention.

BRIEF DESCRIPTION OF THE DRAWINGS

FIG. 5(a) is a vertical cross-sectional view schematically showing a pre-slide state of a cable in the slide type cellular phone taken along the longitudinal direction of the components, which corresponds to FIG. 4.

FIG. 5(b) is a view taken along line B-B of FIG. 5(a).

FIG. 6(a) is a vertical cross-sectional view schematically showing a sliding state of the cable in the slide type cellular phone taken along the longitudinal direction of the components, which corresponds to FIG. 4.

FIG. 6(b) is a view taken along line B-B of FIG. 6(a).

FIG. 7(a) is a vertical cross-sectional view schematically showing a post-slide state of the cable in the slide type cellular phone taken along the longitudinal direction of the components, which corresponds to FIG. 4.

FIG. 7(b) is a view taken along line B-B of FIG. 7(a).

FIG. 10(a) is a vertical cross-sectional view showing schematically showing a pre-slide state of a cable in the slide type cellular phone taken along the longitudinal direction of the components, which corresponds to FIG. 9.

FIG. 10(b) is a view taken along line B-B of FIG. 10(a).

FIG. 12(a) is a vertical cross-sectional view schematically showing a post-slide state of the cable in the slide type cellular phone taken along the longitudinal direction of the components, which corresponds to FIG. 9.

FIG. 12(b) is a view taken along line B-B of FIG. 12(a).

FIG. 13(a) is a vertical cross-sectional view schematically showing a pre-slide state of a cable in components of a slide type cellular phone according to a third embodiment of the present invention along a longitudinal direction of the components.

FIG. 13(b) is a view taken along line B-B of FIG. 13(a).

FIG. 14(a) is a vertical cross-sectional view schematically showing a sliding state of the cable in the slide type cellular phone taken along the longitudinal direction of the components.

FIG. 14(b) is a view taken along line B-B of FIG. 14(a).

FIG. 15(a) is a vertical cross-sectional view schematically showing a post-slide state of the cable in the slide type cellular phone taken along the longitudinal direction of the components.

FIG. 15(b) is a view taken along line B-B of FIG. 15(a).

FIG. 20(a) is a plan view of the primary part, and FIG. 20(b) is a side view of the primary part.

FIG. 21(a) is a vertical cross-sectional view schematically showing a pre-slide state of a cable in the slide type cellular phone taken along the longitudinal direction of the components, which corresponds to FIG. 18.

FIG. 21(b) is a view taken along line B-B of FIG. 21(a).

FIG. 23(a) is a vertical cross-sectional view schematically showing a post-slide state of the cable in the slide type cellular phone taken along the longitudinal direction of the components, which corresponds to FIG. 18.

FIG. 23(b) is a view taken along line B-B of FIG. 23(a).

MODE FOR EMBODYING THE INVENTION

Figure 1B:
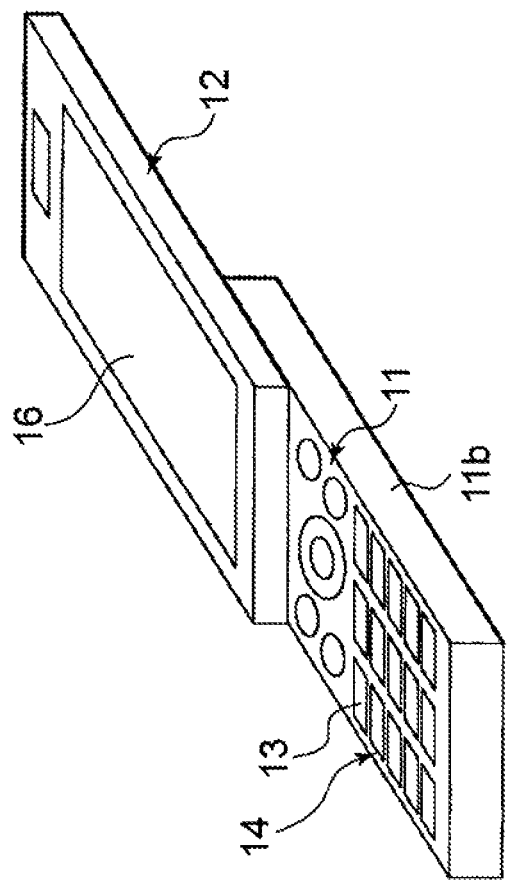
FIG. 1(b) is a perspective view showing the slide type cellular phone in an opened state.
Figure 1A:
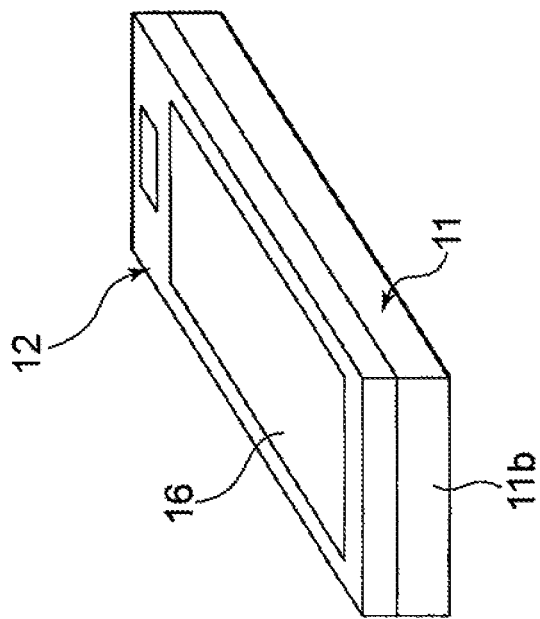
FIG. 1(a) is a perspective view showing a slide type cellular phone in a closed state according to a first embodiment of the present invention.
Figure 2A:
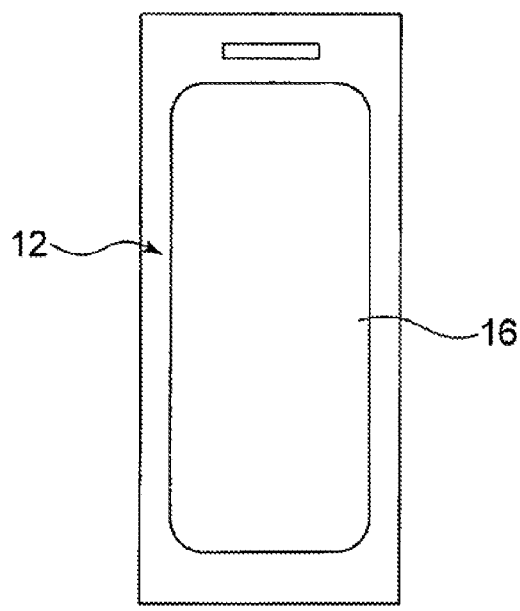
FIG. 2(a) is a plan view showing the slide type cellular phone in the closed state.
Figure 2B:
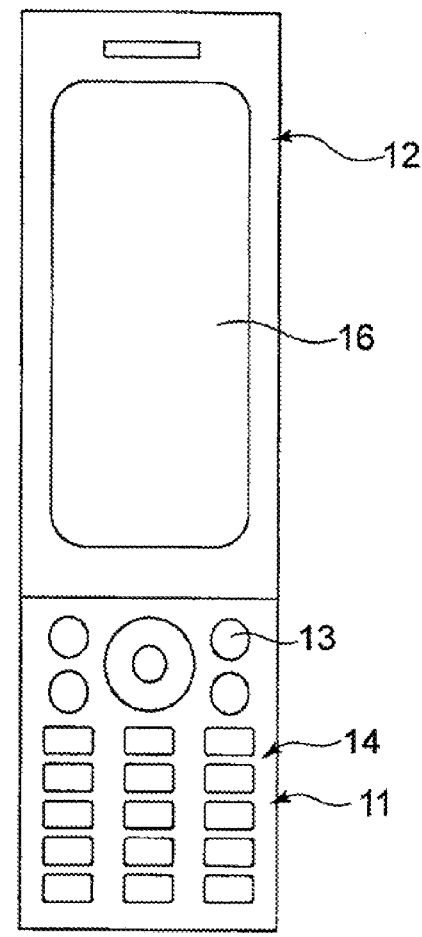
FIG. 2(b) is a plan view showing the slide type cellular phone in the opened state.

Some embodiments of the present invention will be described below with reference to the drawings.

(Embodiment 1)

A slide type cellular phone according to a first embodiment of the present invention will be described with reference to FIGS. 1(a) to 7(b).

As shown in FIGS. 1(a), 1(b), 2(a), and 2(b), the cellular phone (electronic device) according to the first embodiment is what is called a slide type cellular phone in which an operation component case 11 and a display component case 12 have roughly the same shape of a thin box and move relative to each other in a longitudinal direction while they are opposed to each other. The operation component case 11 has an operation part 14 in which various operation keys 13 are arranged. The operation component case 11 includes a microphone, which is not shown in the drawings, and thus constitutes a microphone component. Meanwhile, the display component case 12 has a display screen 16 provided thereon. The display component case 12 includes a speaker, which is not shown in the drawings, and thus constitutes a receiver component. In the following description, the vertical direction does not refer to the thickness direction of the operation component case 11 or the display component case 12 but is based upon an upper side or a lower side of operation or display.

Figure 3:
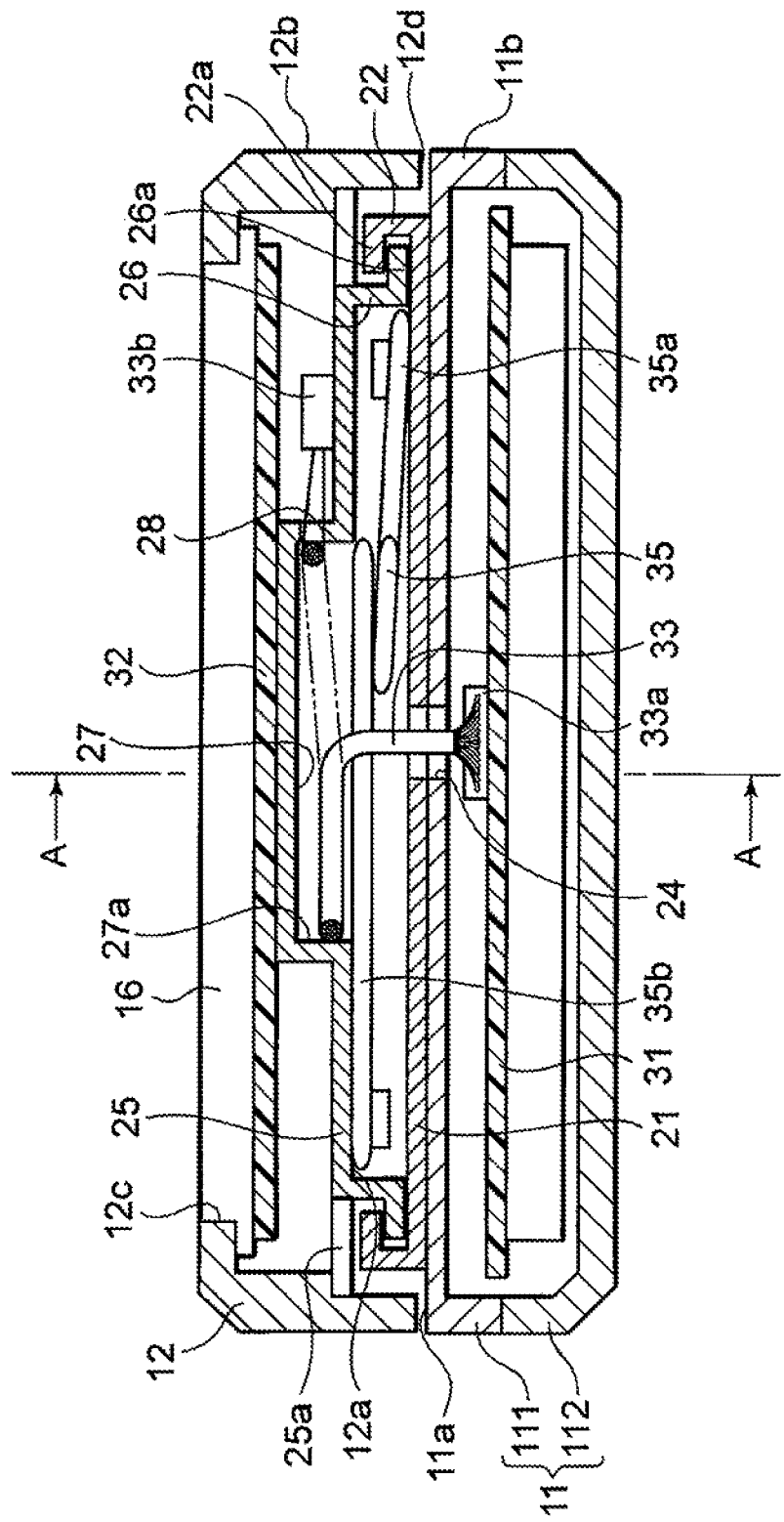
FIG. 3 is a vertical cross-sectional view showing an internal structure of the slide type cellular phone taken along line A-A of FIG. 4 in a width direction of components.
Figure 4:
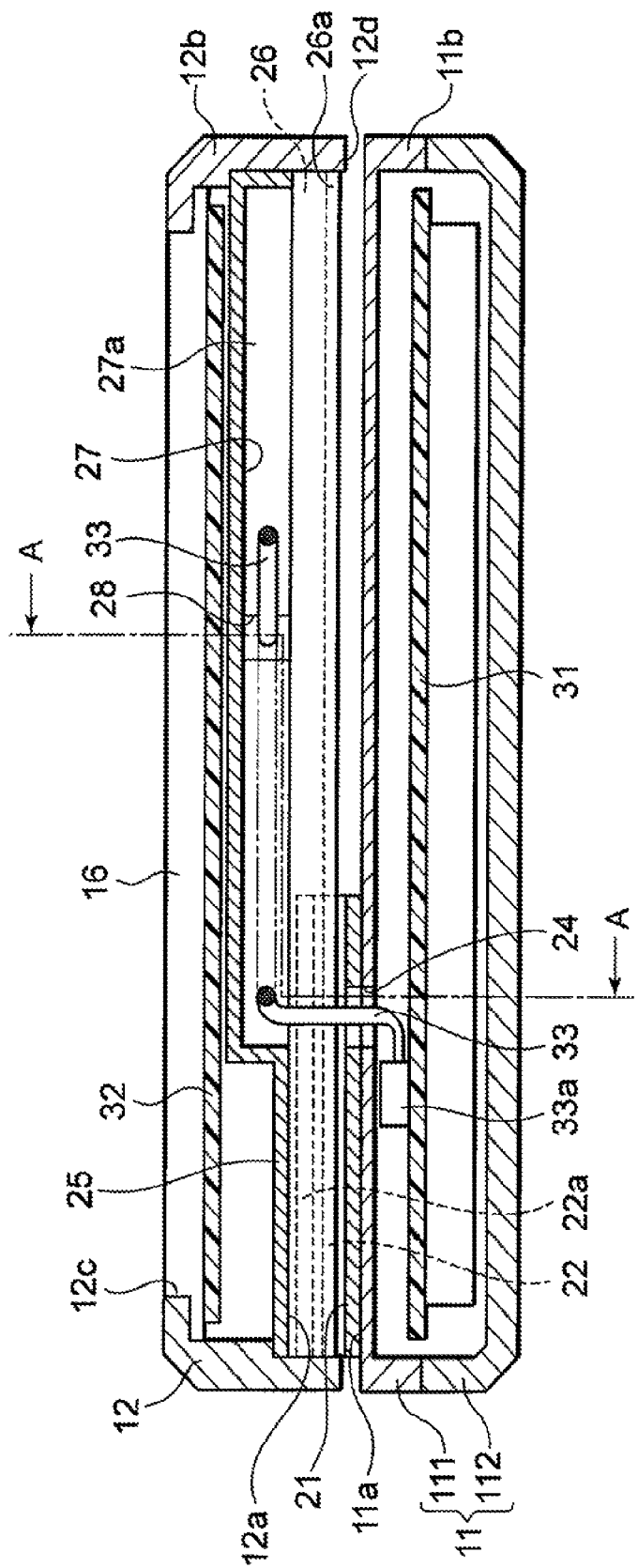
FIG. 4 is a vertical cross-sectional view showing the internal structure of the slide type cellular phone taken along line A-A of FIG. 3 in a longitudinal direction of the components.

As shown in FIGS. 3 and 4, the operation component case 11 and the display component case 12 are connected to each other so that a slider 21, which is fixed to an upper side of the operation component case 11 in the longitudinal direction by screws or the like, allows the display component case 12 to slide upward along the longitudinal direction from a position at which opposed surfaces 11a and 12a of the operation component case 11 and the display component case 12 face and overlap each other. The opposed surface 11a of the operation component case 11 is formed by a surface including the operation part 14. The slider 21 is fixed to an upper side of the operation part 14. The opposed surface 12a of the display component case 12 is formed by a rear surface of the display screen 16 and recessed so as to receive the slider 21.

The operation component case 11 is produced so as to have such a structure that the box component is divided into two components of a front component 111 and a rear component 112, which are assembled into a side part 11b of the box component. The operation part 14 is provided on the opposed surface 11a, which is located at the front side of the front component 111. The slider 21 is fixed on the opposed surface 11a. Meanwhile, the display component case 12 is produced so as to have a frame shape in which a large opening portion 12c to which the display screen 16 is attached is formed in a front surface of the display component case 12. A rail plate 25 is fixed to an inner surface of a side part 12b of the frame shape from the rear side of the display component case 12 by screws or the like. In brief, the rail plate 25 closes the rear side of the frame shape in the display component case 12 and includes the opposed surface 12a. The rail plate 25 may be produced by pressing a metal material such as a sheet metal. In such a case, fixing parts 25a may be formed at both ends of an upper side and a lower side of the rail plate 25 for screwing the rail plate 25 on the display component case 12. The rail plate 25 may use not only a sheet metal, but also a magnesium mold for light weight. Furthermore, the rail plate 25 can be produced at low cost by using a resin mold. In the case where a resin mold is used, for example, a filler may be mixed so as to improve the strength.

The rail plate 25 of the display component case 12 is located closer to the opening portion 12c than rear opening ends 12d of the side part 12b. The rail plate 25 forms a concave space that is capable of receiving the slider 21 on the operation component case 11. The rail plate 25 has a rail 26 projecting rearward in the form of a rib from both sides of the rail plate 25 and extending in the longitudinal direction. Flange parts 26a project outward from tip ends of the rail 26 and extend similarly in the longitudinal direction. In contrast, the slider 21 of the operation component case 11 has a rail 22 extending in parallel to the rail 26 of the display component case 12 so as to face an outside of the rail 26. Similarly, flange parts 22a extend inward from tip ends of the rail 22 and extend in parallel to the flange parts 26a of the rail 26. Specifically, the rail 26 of the rail plate 25 and the flange parts 26a of the rail 26 face and engage with the rail 22 of the slider 21 and the flange parts 22a of the operation component case 11, so that the display component case 12 slides and moves relative to the operation component case 11 in a direction in which the rail 26, the flange part 26a, the rail 22, and the flange parts 22a extend. Thus, the display component case 12 is coupled and attached to the slider 21 so as to be slidable in the longitudinal direction.

Furthermore, a slide spring (torsion spring) 35 is arranged between the opposed surfaces 11a and 12a for assisting (supporting) an opening operation and a closing operation of the operation component case 11 and the display component case 12. As shown in FIGS. 5(a) to 7(b), a first end 35a of the slide spring 35 is fixed to near one side surface of the slider 21 in a pivotable manner, and a second end 35b is fixed to near another side surface at an intermediate location of the rail plate 25 in a pivotable manner. The slide spring 35 is attached in a curving posture so that its biasing direction is directed to an expansion direction in which the slide spring is to come into a linear shape. Therefore, the slide spring 35 can bias both of an opening direction and a closing direction by changing its posture and switching the biasing direction depending upon the amount of sliding the operation component case 11 and the display component case 12 relative to each other. Specifically, when major parts of the operation component case 11 and the display component case 12 are superimposed on each other, the slide spring 35 takes a posture in which a portion located on the side of the first end 35a extends across the component and biases the slider 21 in an upward direction. In other words, the slide spring 35 biases the slider 21 in such a direction that the operation component case 11 and the display component case 12 are brought into a closed state in which the operation component case 11 and the display component case 12 are fully superimposed on each other. Furthermore, when small amounts of the operation component case 11 and the display component case 12 are superimposed on each other, the slide spring 35 takes a posture in which a portion located on the side of the second end 35b extends across the component and biases the rail plate 25 in an upward direction. In other words, the slide spring 35 biases the rail plate 25 in such a direction that the operation component case 11 and the display component case 12 are brought into an opened state in which the operation component case 11 and the display component case 12 are superimposed on each other only at a portion of the slider 21.

The operation component case 11 stores therein a circuit board 31 having various kinds of parts mounted thereon, such as the operation part 14 and a microphone. Similarly, the display component case 12 stores therein a circuit board 32 having various kinds of parts mounted thereon, such as the display screen 16 or a speaker. Those circuit boards 31 and 32 are conductively connected to each other by fitting connectors, which are not shown in the drawings, into connectors 33a and 33b on both ends of a plurality of ultrafine coaxial cables 33 for conductive connection of the circuit boards 31 and 32. The ultrafine coaxial cables 33 are arranged flat in parallel at the side of the connectors 33a and 33b. Intermediate portions of the ultrafine coaxial cables 33 are bundled up. Thus, the ultrafine coaxial cables 33 can readily be curved for wiring. The ultrafine coaxial cables 33 may be configured so that the overall length is reduced on sides of the connectors 33a and 33b in the width direction as compared to the other sides and may be curved in a flat state. In this case, at least intermediate portions of the ultrafine coaxial cables 33 are configured to be capable of shifting in an extension direction so that the curving portion can readily be shifted along the extension direction.

The operation component case 11 has a cable hole 24 extending through an upper portion of the front component 111 and the slider 21. The cable hole 24 is located at a lower side of the first end 35a of the slide spring 35 so that it does not overlap the first end 35a of the slide spring 35. The ultrafine coaxial cables 33 having the connector 33a connected to the circuit board 31 are drawn from the cable hole 24.

A slide groove 27, which is a single-layer space, is formed in the rail plate 25 of the display component case 12 so as to extend downward from a location corresponding to the cable hole 24 of the operation component case 11 with a width of about ⅓ of the width of the component. The slide groove 27 is shallowly recessed inward of the component (the slide groove 27 is thin in the thickness direction of the component) so that it does not overlap the movement spaces of the slider 21 and the slide spring 35. The display component case 12 has a cable hole 28 extending through an inner side surface 27a of the slide groove 27 of the rail plate in the longitudinal direction roughly at the center of the inner side surface 27a. The ultrafine coaxial cables 33 having the connector 33b connected to the Circuit board 32 are drawn from the cable hole 28.

The ultrafine coaxial cables 33 that have been drawn from the cable hole 24 of the operation component case 11 are predisposed to extend downward and separate from the cable hole 24 toward an inner side surface 27a opposed to the cable hole 28 of the slide groove 27 of the rail plate 25 of the display component case 12. Furthermore, the ultrafine coaxial cables 33 that have been drawn from the cable hole 28 of the display component case 12 are predisposed to extend downward and separate from the cable hole 28 toward the same inner side surface 27a. Additionally, the ultrafine coaxial cables 33 are curved in the form of a large U-shape in the plane direction at a lower portion of the component while they abut on both of the inner side surfaces 27a. Thus, the ultrafine coaxial cables 33 are stored in the slide groove 27 of the rail plate 25 of the display component case 12 in a continuous manner. The ultrafine coaxial cables 33 extend in the separation direction in an outer space of the slide groove 27 of the rail plate 25 (in the display component case 12 or the operation component case 11) after they are drawn from the cable hole 24 or 28. In brief, the ultrafine coaxial cables 33 from the cable hole 24 are predisposed in the operation component case 11 to take such a posture that they are in parallel to the inner side surface 27a of the slide groove 27 of the rail plate 25 of the display component case 12. Furthermore, the ultrafine coaxial cables 33 from the cable hole 28 are predisposed in the display component case 12 to extend and separate from the cable hole 28.

Accordingly, the ultrafine coaxial cables 33 are not forcibly curved with a high curvature (or a small radius of curvature). The ultrafine coaxial cables 33 can greatly be curved with effective use of the width of the slide groove 27. Thus, the ultrafine coaxial cables 33 are not thickened in the thickness direction and can be stored within the slide groove 27. Furthermore, the ultrafine coaxial cables 33 are stored in the same slide groove 27 after they are drawn from the cable holes 24 and 28. Therefore, the operation component case 11 and the display component case 12 can be slid to a greater degree as compared to a case where a flexible printed wiring board, which needs a storage space in each of the operation component case 11 and the display component case 12, is used. Moreover, the cable holes 24 and 28 are opened at positions spaced in the vertical direction. Therefore, the operation component case 11 and the display component case 12 can largely be slid without the ultrafine coaxial cables 33 being uselessly lengthened.

In the closed state in which the operation component case 11 and the display component case 12 are fully superimposed on each other, as shown in FIGS. 5(a) and 5(b), the ultrafine coaxial cables 33 in the slide groove 27 are curved downward just from the cable hole 28 of the rail plate 25 and directed toward the opposite inner side surface 27a. Accordingly, the ultrafine coaxial cables 33 are pressed against the inner side surfaces 27a by their elastic recovery forces so that they abut on the inner side surfaces 27a. The ultrafine coaxial cables 33 extend to the cable hole 24 of the slider 21 while they hold the pressure contact with the inner side surfaces 27a.

Furthermore, as shown in FIGS. 6(a) and 6(b), the cable hole 28 of the rail plate 25 is brought close to the cable hole 24 of the slider 21 during a sliding movement of the operation component case 11 and the display component case 12 into the opened state or the closed state. Therefore, the ultrafine coaxial cables 33 in the slide groove 27 are brought into sliding contact with both of the inner side surfaces 27a while they hold the state in which the ultrafine coaxial cables 33 are pressed against both of the inner side surfaces 27a by their elastic recovery forces so that they abut on the inner side surfaces 27a. The ultrafine coaxial cables 33 vary the curving portion according to the opening direction and the closing direction, or the separation locations from the cable holes 24 and 28.

Moreover, in the opened state in which the operation component case 11 and the display component case 12 are superimposed on each other only at the installation portion of the slider 21, as shown in FIGS. 7(a) and 7(b), the ultrafine coaxial cables 33 in the slide groove 27 are curved downward just from the cable hole 24 of the slider 21 and directed toward the opposite inner side surface 27a, which is opposite to the closed state. Accordingly, the ultrafine coaxial cables 33 are pressed against the inner side surface 27a by their elastic recovery forces so that they abut on the inner side surface 27a. The ultrafine coaxial cables 33 extend to the cable hole 28 of the rail plate 25 while they hold the aforementioned state.

At that time, since the ultrafine coaxial cables 33 are held in a state in which they are pressed against the inner side surface 27a of the slide groove 27 by their elastic recovery forces, the ultrafine coaxial cables 33 are stored at a position different from the position of the slide spring 35 disposed on the opening end 12d of the display component case 12 in the thickness direction of the component. Therefore, the ultrafine coaxial cables 33 and the slide spring 35 do not interfere with each other. Furthermore, the ultrafine coaxial cables 33 are drawn downward from the cable holes 24 and 28. Therefore, if the ultrafine coaxial cables 33 should be brought into contact with the first end 35a or the second end 35b of the slide spring 35, which takes a posture to extend across the component at an upper side of the cable holes 24 and 28, they are just brought into sliding contact with the slide spring 35 while they are stored in the slide groove 27. Thus, the ultrafine coaxial cables 33 are not tangled with the slide spring 35.

Thus, according to the first embodiment, the ultrafine coaxial cables 33, which are drawn from the cable holes 24 and 28, can be curved in the plane direction and stored within the slide groove (single-layer space) 27, which is formed in the rail plate 25 between the opposed surfaces 11a and 12a of the operation component case 11 and the display component case 12 and is thin in the thickness direction. The ultrafine coaxial cables 33 can vary the curving portion while they are stored within the thin space of the slide groove 27 that is different from spaces in which the slider 21 and the slide spring 35 move, and can follow the relative sliding movement of the operation component case 11 and the display component case 12 without any interference with the slider 21 and the slide spring 35. Therefore, the ultrafine coaxial cables 33 can be stored in the slide groove 27 instead of a flexible printed wiring board, which has frequently been used for wiring (harness) of a slide type cellular phone and a conductive connection of the circuit boards 31 and 32 can be maintained. As a result, it is possible to improve the transmission characteristics of signals and avoid interference with other parts and influence from a disturbance. At the same time, further reduction of the thickness can be achieved with a simple structure without a storage space prepared in each of the operation component case 11 and the display component case 12 (without increase of the thickness of the components), unlike a flexible printed wiring board.

(Embodiment 2)

A slide type cellular phone according to a second embodiment of the present invention will be described with reference to FIGS. 8 to 12(b). Portions similar to those in the aforementioned first embodiment are denoted by the same reference numerals, and the explanation thereof may be omitted herein.

Figure 8:
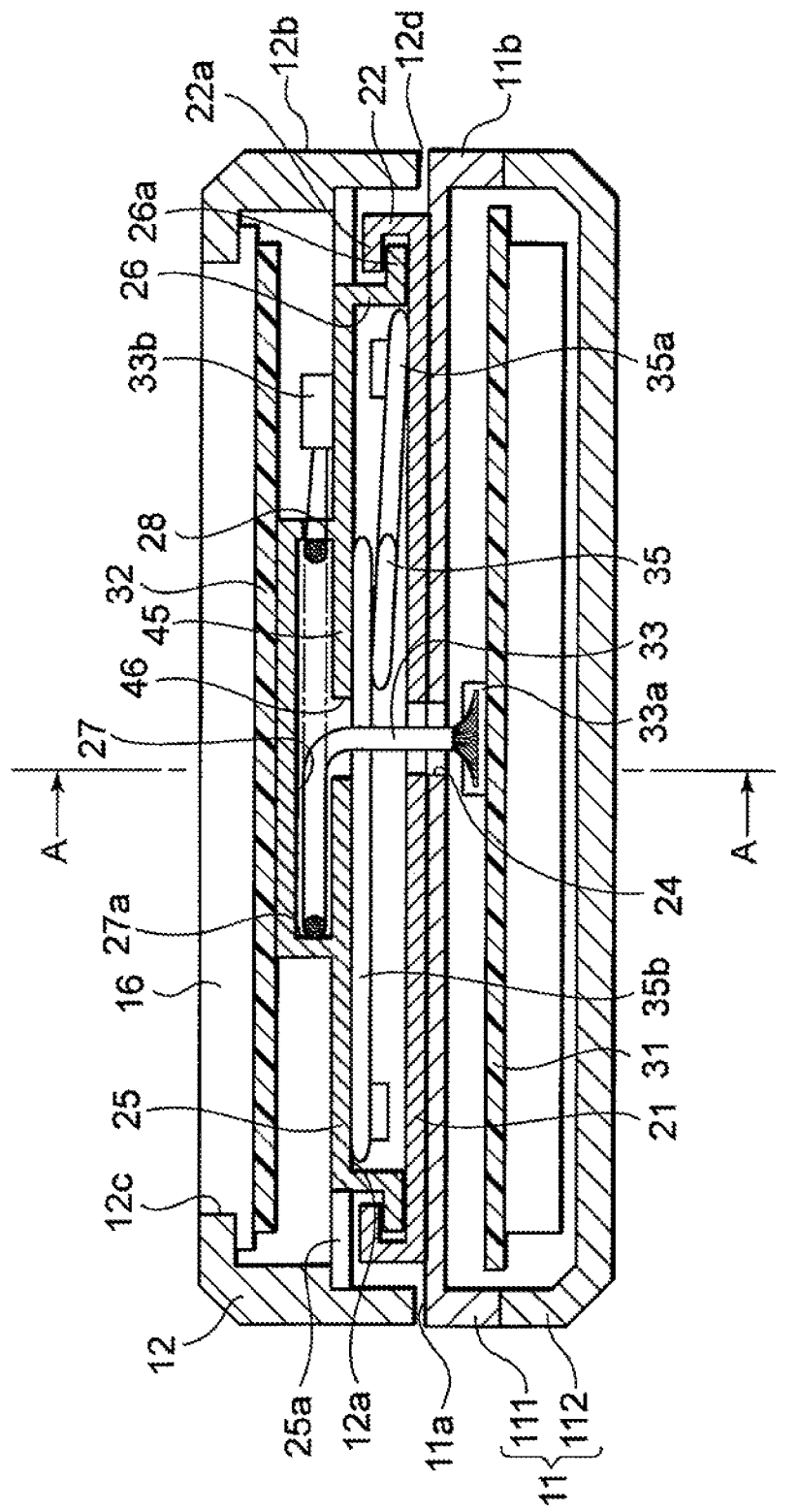
FIG. 8 shows a slide type cellular phone according to a second embodiment of the present invention and is a vertical cross-sectional view showing an internal structure of the slide type cellular phone taken along line A-A of FIG. 9 in a width direction of components.
Figure 9:
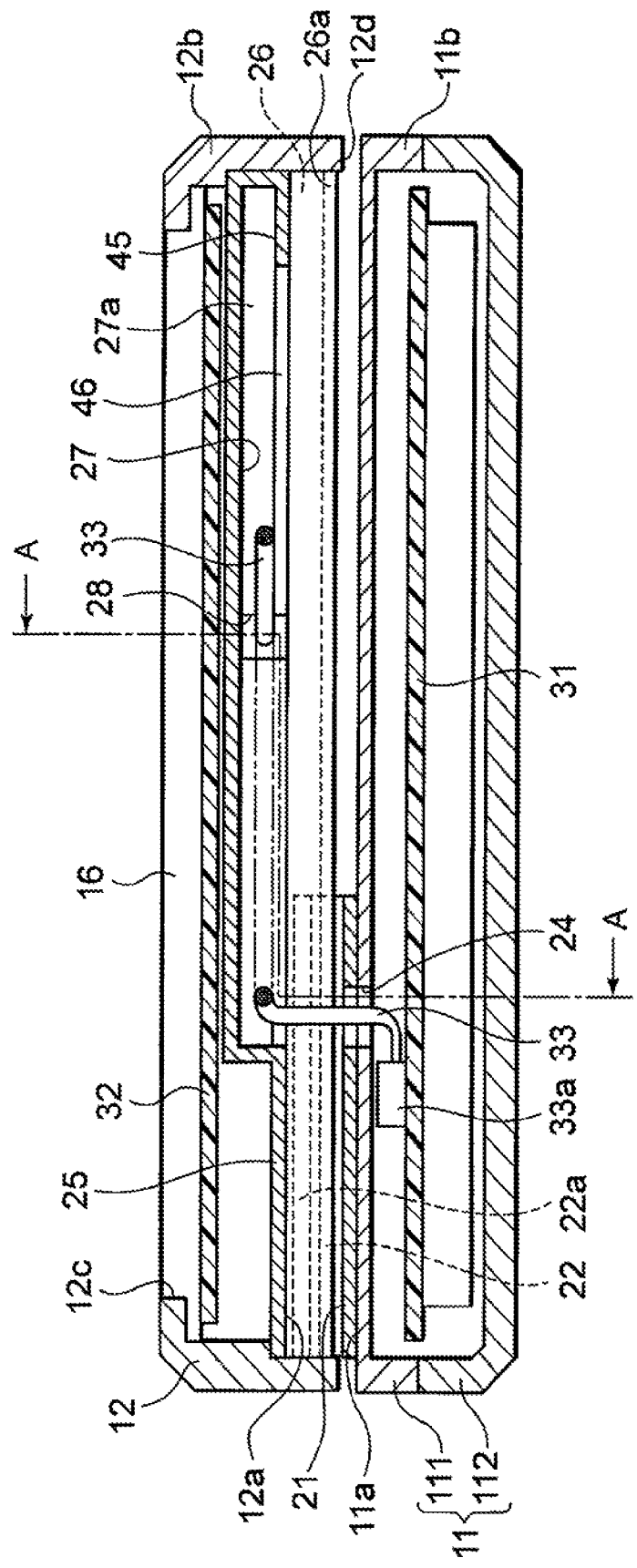
FIG. 9 is a vertical cross-sectional view showing the internal structure of the slide type cellular phone taken along line A-A of FIG. 8 in a longitudinal direction of the components.

As shown in FIGS. 8 and 9, in the cellular phone according to the second embodiment, the rail plate 25 of the display component case 12 includes a support plate 45 formed so as to have substantially the same shape as an opening shape of the slide groove 27; The support plate 45 is similarly produced by pressing a sheet metal. For example, the support plate 45 is jointed by spot welding so as to cover the slide groove 27. The support plate 45 is jointed so as to form a flange shape extending inward from an opening edge of the slide groove 27 at the same level as an adjacent surface of the rail plate 25. The support plate 45 has an elongated slide hole 46 extending along the longitudinal direction at the center thereof in the width direction. The elongated slide hole 46 is opened so as to have a width that is substantially the same as the diameter of the cable hole 24 of the operation component case 11. Specifically, as shown in FIGS. 10(a) to 12(b), the support plate 45 supports the ultrafine coaxial cables 33 adjacent to the inner side surfaces 27a, which define a storage space of the ultrafine coaxial cables 33 in the slide groove 27, so that the ultrafine coaxial cables 33 does not come off. Furthermore, the support plate 45 exposes the cable hole 24 in the elongated slide hole 46 so that the ultrafine coaxial cables 33 can always be inserted into the cable hole 24 even if the display component case 12 is slid relative to the operation component case 11.

Figure 11A:
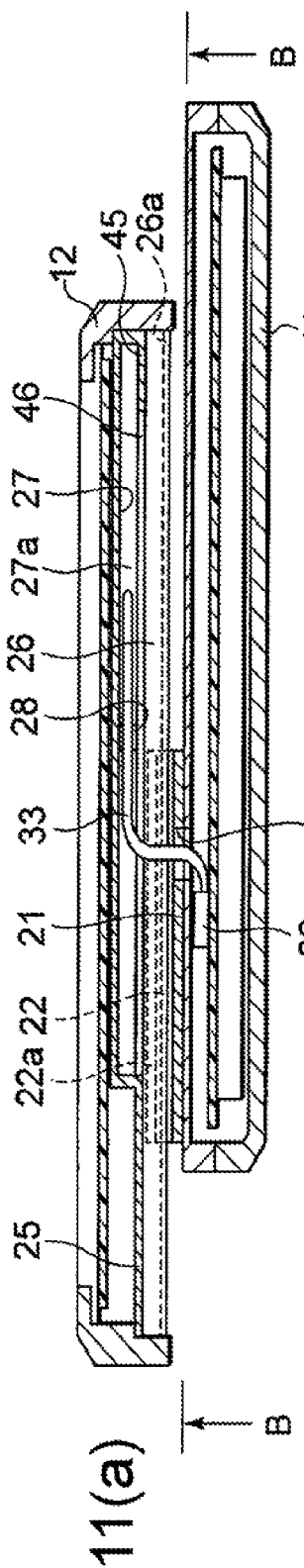
FIG. 11(a) is a vertical cross-sectional view schematically showing a sliding state of the cable in the slide type cellular phone taken along the longitudinal direction of the components, which corresponds to FIG. 9.
Figure 11B:
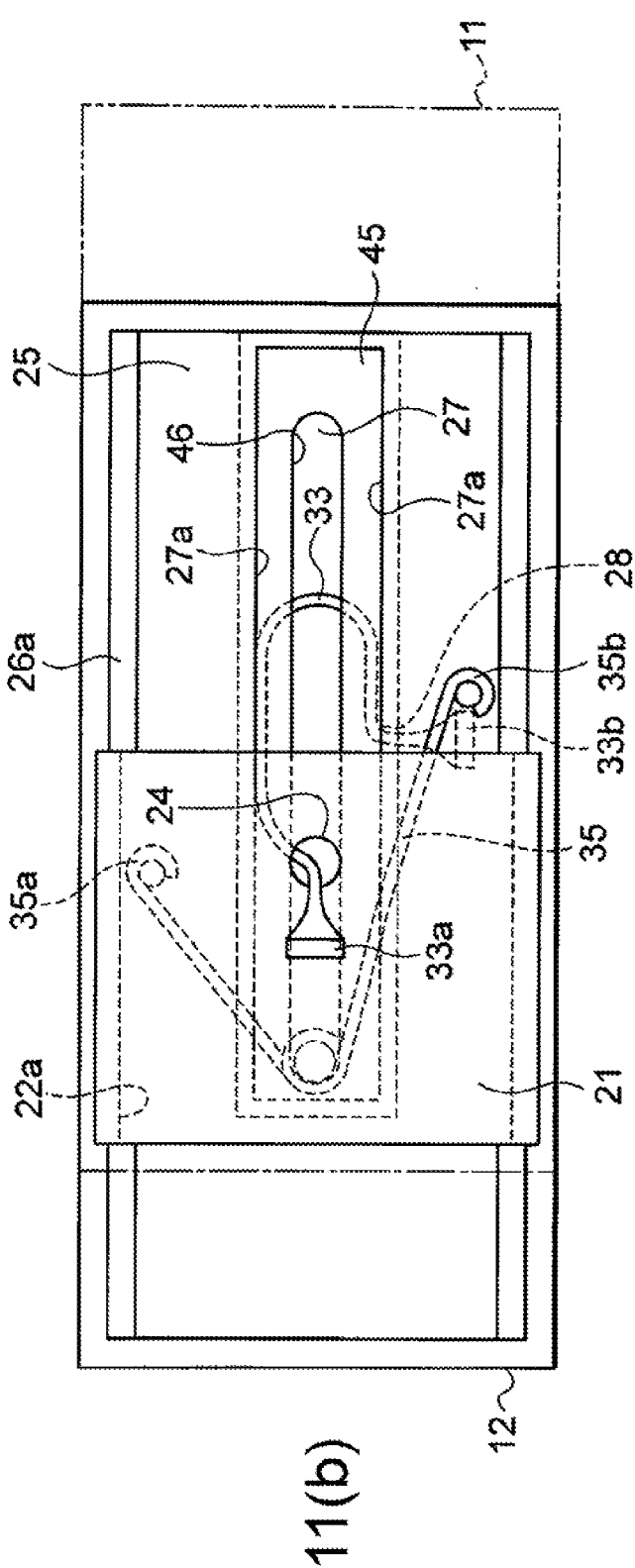
FIG. 11(b) is a view taken along line B-B of FIG. 11(a).

As with the aforementioned first embodiment, FIGS. 10(a) and 10(b) show a closed state in which the operation component case 11 and the display component case 12 are fully superimposed on each other, FIGS. 11(a) and 11(b) show a state during a sliding movement of the opening/closing operation of the operation component case 11 and the display component case 12, and FIGS. 12(a) and 12(b) show an opened state in which the operation component case 11 and the display component case 12 are superimposed on each other only at the installation portion of the slider 21.

Accordingly, the support plate 45 can clearly separate a space of the display component case 12 in which the slider 21 and the slide spring 35 move and a space in which the ultrafine coaxial cables 33 are stored with varying their curving position in the slide groove 27 from each other in parallel to the rail plate 25. Thus, the slide groove 27 can be prevented with certainty from being brought into contact with the slider 21 and the slide spring 35.

According to the second embodiment, in addition to the aforementioned advantageous effects of the first embodiment, it is possible to eliminate the possibility that the ultrafine coaxial cables 33 are brought into contact with the slider 21 and the slide spring 35 even if an impulsive force is applied at the time of dropping the cellular phone or the like, and avoid damage to the ultrafine coaxial cables 33 with higher reliability.

In another example of the second embodiment, the illustration of which is omitted, a rib having a hooked cross-sectional shape may be formed so as to extend from the opening edge of the slide groove 27 instead of the support plate 45, so that the ultrafine coaxial cables 33 engage with the rib. The hooked cross-sectional shape may be formed by a plurality of projections, not by extension of a rib. In such a case, the similar advantageous effects can be obtained to some extent.

(Embodiment 3)

A slide type cellular phone according to a third embodiment of the present invention will be described with reference to FIGS. 13(a) to 15(b). Portions similar to those in the aforementioned first and second embodiments are denoted by the same reference numerals, and the explanation thereof may be omitted herein.

As shown in FIGS. 13(a) and 13(b), in the cellular phone according to the third embodiment, the slide groove 27 of the rail plate 25 of the display component case 12 is narrowed from an upper portion to an intermediate portion of the slide groove 27 by the amount slightly larger than the thickness of the ultrafine coaxial cables 33. A vertical surface 27b perpendicular to the inner side surface 27a is formed on an inner side of the slide groove 27, with which the ultrafine coaxial cables 33 are brought into contact under pressure. The display component case 12 has a cable hole 58 extending through the vertical surface 27b. The ultrafine coaxial cables 33 having the connector 33b connected to the circuit board 32 are drawn from the cable hole 58. The third embodiment illustrates a variation of the layout of the connectors 33a and 33b on both ends of the ultrafine coaxial cables 33. Specifically, the ultrafine coaxial cables 33 extending through the cable holes 24 and 58 into the interiors of the operation component case 11 and the display component case 12 are predisposed to gently curve from a posture parallel to the inner side surfaces 27a of the slide groove 27 and extend in the orthogonal direction.

Therefore, the ultrafine coaxial cables 33 can be inserted into the cable hole 58 in parallel to the inner side surfaces 27a of the slide groove 27 even in the state shown in FIGS. 14(a) and 14(h) or the state shown in FIGS. 15(a) and 15(h).

FIGS. 13(a) and 13(b) show a closed state in which the operation component case 11 and the display component case 12 are fully superimposed on each other, FIGS. 14(a) and 14(b) show a state during a sliding movement of the opening operation and the closing operation of the operation component case 11 and, the display component case 12, and FIGS. 15(a) and 15(b) show an opened state in which the operation component case 11 and the display component case 12 are superimposed on each other only at the installation portion of the slider 21.

According to the third embodiment, in addition to the aforementioned advantageous effects of the first and second embodiments, it is possible to reduce a load applied when the ultrafine coaxial cables 33 are curved. Therefore, it is possible to avoid damage to the ultrafine coaxial cables 33 with higher reliability.

(Embodiment 4)

A slide type cellular phone according to a fourth embodiment of the present invention will be described with reference to FIGS. 16 to 23(b). Portions similar to those in the aforementioned first to third embodiments are denoted by the same reference numerals, and the explanation thereof may be omitted herein.

Figure 16:
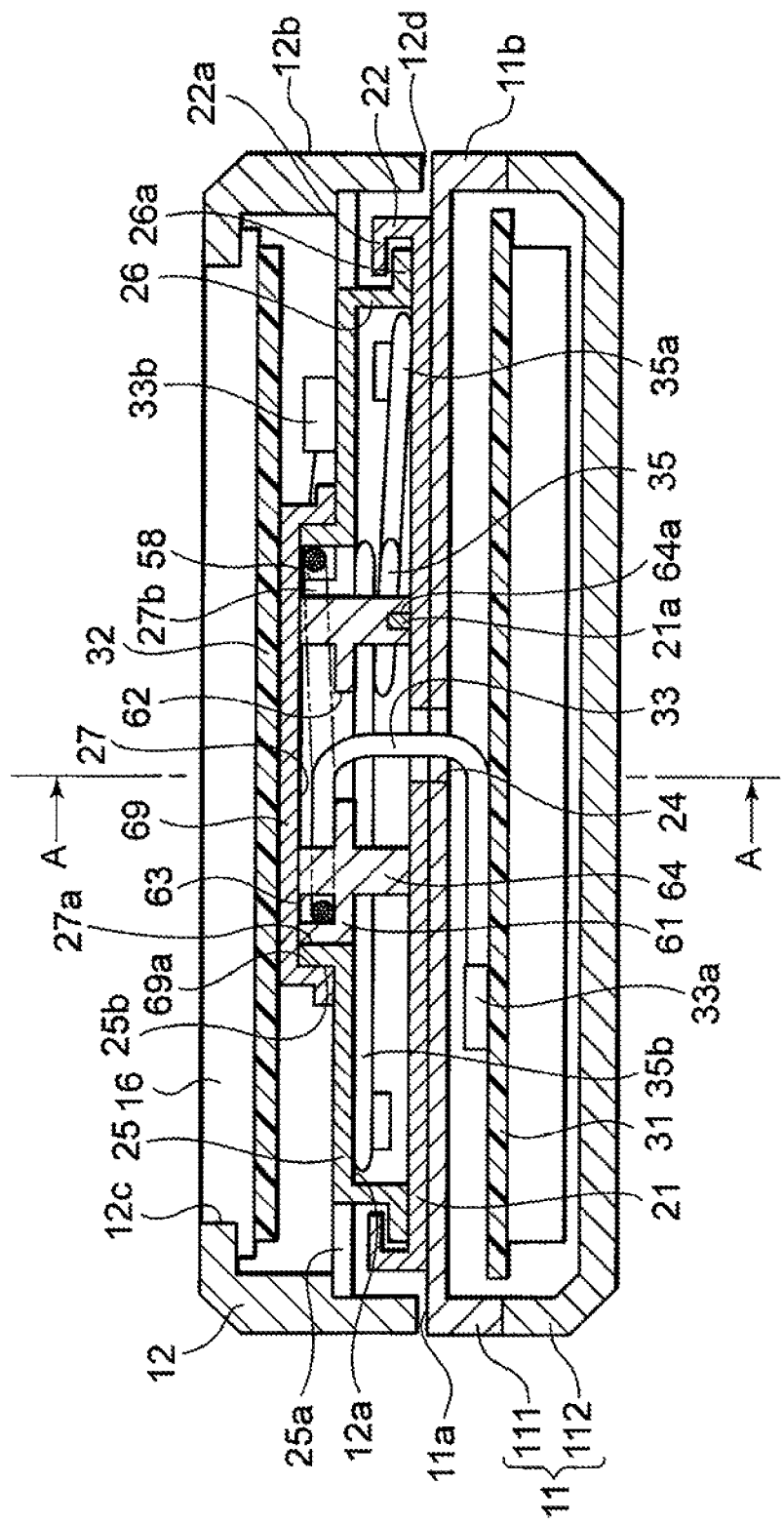
FIG. 16 shows a slide type cellular phone according to a fourth embodiment of the present invention and is a vertical cross-sectional view showing an internal structure of the slide type cellular phone taken along line A1-A1 of FIG. 18 in a width direction of components.
Figure 17:
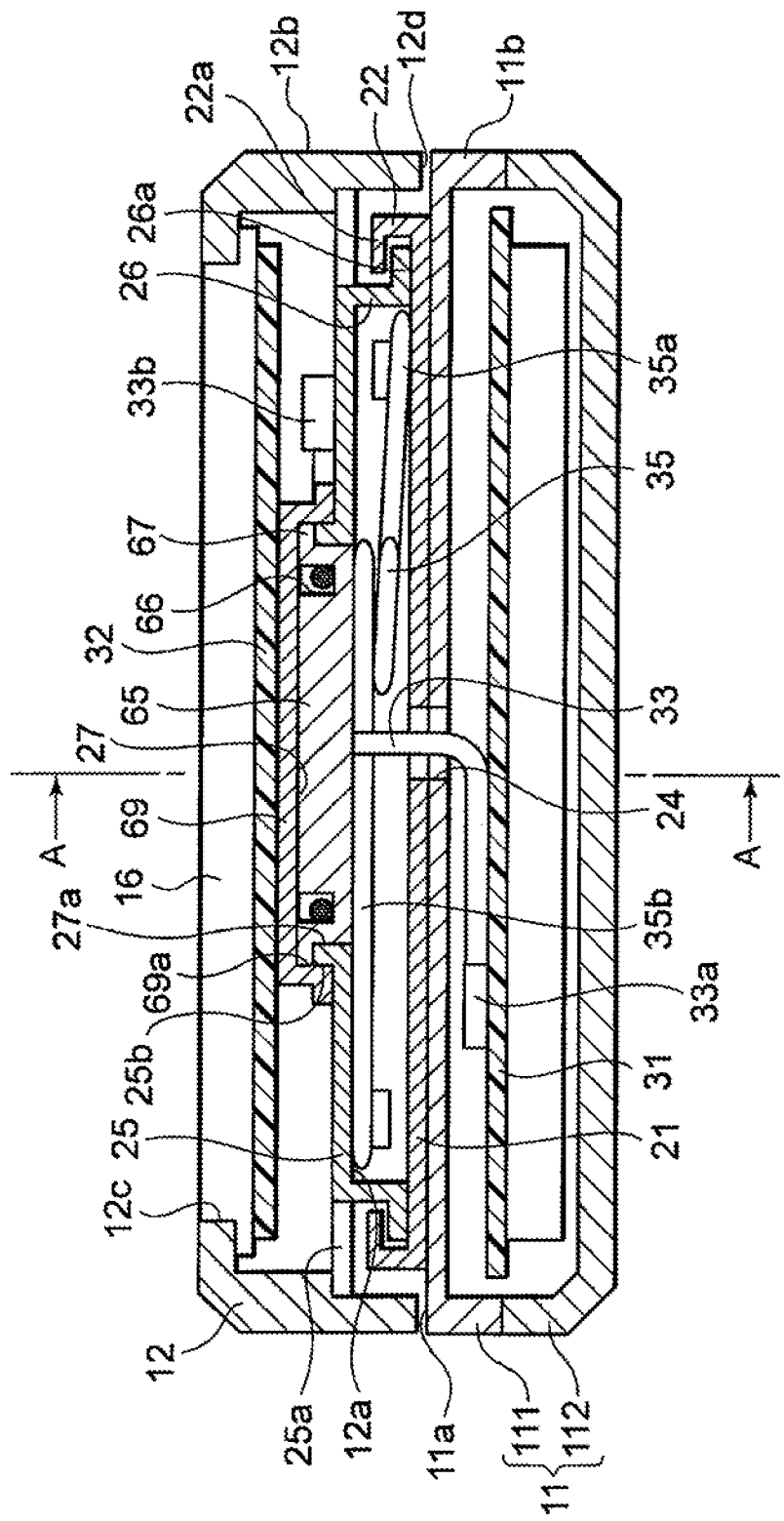
FIG. 17 is a vertical cross-sectional view showing the internal structure of the slide type cellular phone taken along line A2-A2 of FIG. 18 in the width direction of the components.
Figure 18:
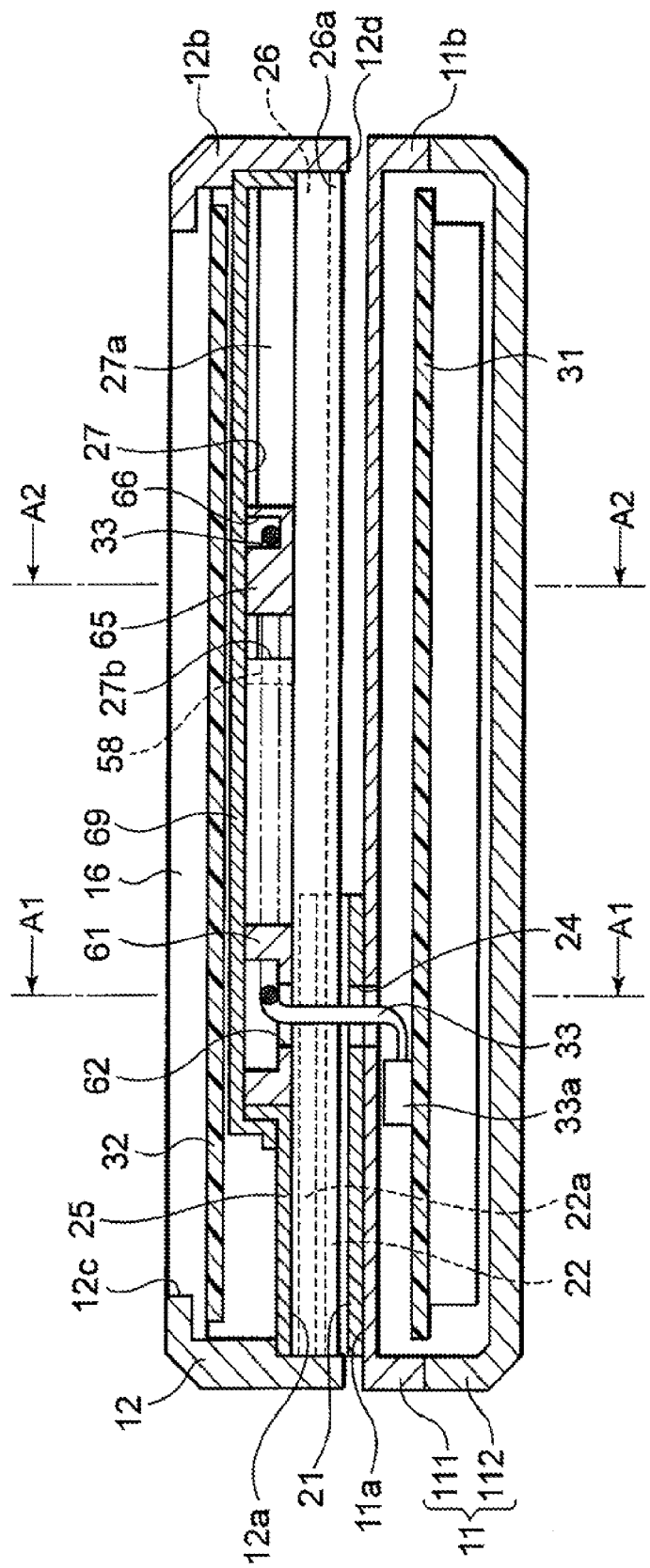
FIG. 18 is a vertical cross-sectional view showing the internal structure of the slide type cellular phone taken along lines A-A of FIGS. 16 and 17 in a longitudinal direction of the components.
Figure 19D:
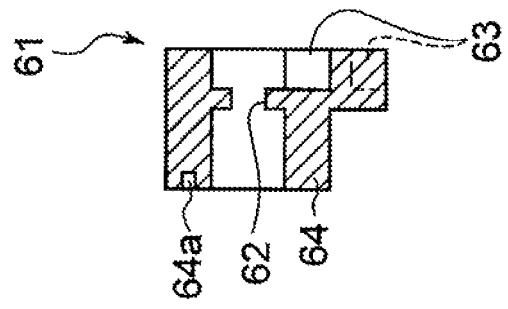
FIG. 19(d) is a vertical cross-sectional view taken along line C-C of FIG. 19(a).
Figure 19C:
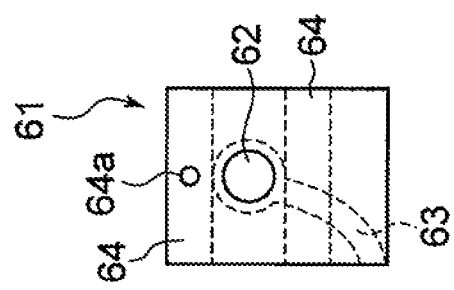
FIG. 19(c) is a bottom view of the primary part.
Figure 19B:
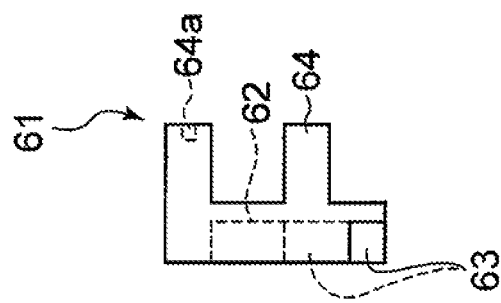
FIG. 19(b) is a side view of the primary part.
Figure 19A:
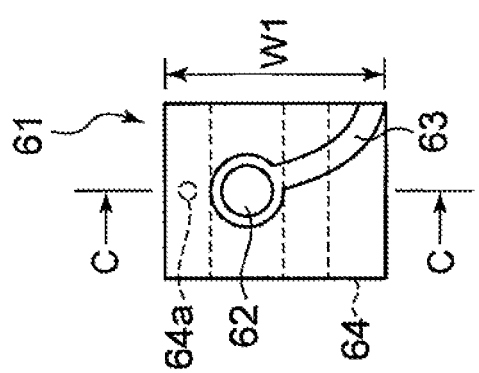
FIG. 19(a) is a plan view of a primary part of the slide type cellular phone.

As shown in FIGS. 16 to 18, in the cellular phone according to the fourth embodiment, a bottom of the slide groove 27 in the rail plate 25 of the display component case 12 (a ceiling portion in the drawings) is removed and is fully opened so as to allow a guide member 61 or a slide member 65, which will be described later, to be fitted into the opening. A cover member 69 is fixed to the rail plate 25 so that inner side surfaces 69a of the cover member 69 are brought into close contact with outer side surfaces 25b of the rail plate 25. Thus, the slide groove 27 is closed. A sidewall of the cover member 69 having the inner side surface 69a may be omitted on an upper side of the slide groove 27 of the rail plate 25 (on a rear side of the vertical surface 27b) in order to open a portion for drawing the ultrafine coaxial cables 33. Alternatively, a cable hole may be formed in the sidewall so that the ultrafine coaxial cables 33 can gently curve toward the connector 33a.

A guide member 61 is disposed in the slide groove 27 of the rail plate 25 near the cable hole 24 between the rail plate 25 of the display component case 12 and the slider 21 of the operation component case 11. A slide member 65 is fitted in the slide groove 27 of the rail plate 25 so that it is located at the curving portion of the ultrafine coaxial cables 33.

As shown in FIGS. 19(a) to 19(d), the guide member 61 has a width W1 such that it can be fitted in an upper narrowed portion of the slide groove 27 of the rail plate 25. The guide member 61 has a guide hole 62 positioned so as to correspond to the cable hole 24 for allowing the ultrafine coaxial cables 33 to pass therethrough. The guide member 61 has a guide groove 63 defined on a side facing the cover member 69 so as to communicate with the guide hole 62. The guide groove 63 stores and guides the ultrafine coaxial cables 33 drawn from the guide hole 62 so that the ultrafine coaxial cables 33 are gently curved and brought into contact with the inner side surface 27a of the slide groove 27 under pressure. The guide member 61 includes ribs 64 rising on a rear surface of the guide groove 63. The ribs 61 are in parallel to the inner side surfaces 27a of the slide groove 27 on both sides of the guide hole 62. A fixing hole 64a is defined in a bottom of at least one of the ribs 64 so that a pin 21a rising on the slider 21 is fitted in the fixing hole 64a.

Thus, the guide member 61 is fixed on the slider 21 and fitted in the slide groove 27 of the rail plate 25 so that the guide member 61 can be slid relative to the slide groove 27. Therefore, the ultrafine coaxial cables 33 that have been drawn from the cable hole 24 into the slide groove 27 are drawn from the guide hole 62 of the guide member 61 and stored in the guide groove 63 so as not to come off. Simultaneously, the guide groove 63 can guide and curve the ultrafine coaxial cables 33 so that the ultrafine coaxial cables 33 are brought into contact with the inner side surface 27a of the slide groove 27 under pressure. In this state, since the pin 21a of the slider 21 is fitted in the fixing hole 64a of the rib 64, the guide member 61 is prevented from being deviated when a load caused by deformation of the ultrafine coaxial cables 33 is applied to the guide member 61. When the guide member 61 is to rotate, the guide member 61 is prevented from moving by abutment against the inner side surfaces 27a of the slide groove 27.

Figure 20A:
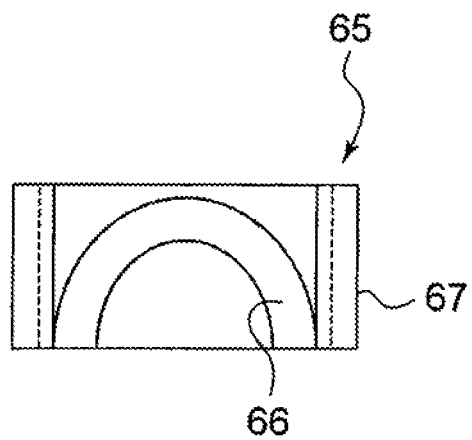
FIGS. 20(a) and 20(b) are views showing a primary part of the slide type cellular phone, which is different from the primary part of FIGS. 19(a) to 19(d).
Figure 20B:
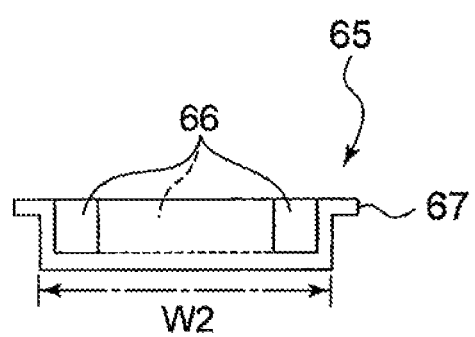

As shown in FIGS. 20(a) and 20(b), the slide member 65 has a width W2 such that it can be fitted in a lower portion of the slide groove 27 of the rail plate 25. The slide member 65 has a storage groove 66 defined for holding a curved shape of the ultrafine coaxial cables 33, which is gently curved between the inner side surfaces 27a of the slide groove 27. Since the storage groove 66 of the slide member 65 only stores the ultrafine coaxial cables 33 with a curving shape, it permits a relative movement in the longitudinal direction. The slide member 65 has flange parts 67 flanged on an opened side of the storage groove 66 so as to project outward. In contrast, the inner side surface 27a at the lower side of the slide groove 27 is formed so as to have a height lower than that of the vertical surface 27b of the slide groove 27 in the rail plate 25.

Therefore, the slide member 65 is supported in such a state that the flange parts 67 are slidably interposed between wall surfaces of the lower portion of the slide groove 27 of the rail plate 25 (the inner side surfaces 27a) and the cover member 69. Accordingly, the ultrafine coaxial cables 33 that have been drawn and curved from the cable holes 24 and 58 into the slide groove 27 are stored in the storage groove 66 of the slide member 65 so as not to come off, and the slide member 65 is slid so as to follow the changes of the curving portion of the ultrafine coaxial cables 33 in the slide groove 27. Thus, the stored state of the ultrafine coaxial cables 33 can be maintained.

Consequently, as shown in FIGS. 21(a) to 23(b), when the operation component case 11 and the display component case 12 are slid relative to each other, the guide member 61 and the slide member 65 can equivalently function to partition the space in the slide groove 27 as with the aforementioned support plate 45. In other words, it is possible to prevent the ultrafine coaxial cables 33 stored in the slide groove 27 from coming off and to eliminate, with certainty, the possibility that the ultrafine coaxial cables 33 are brought into contact with the slider 21 and the slide spring 35.

Figures 22A, 22B:
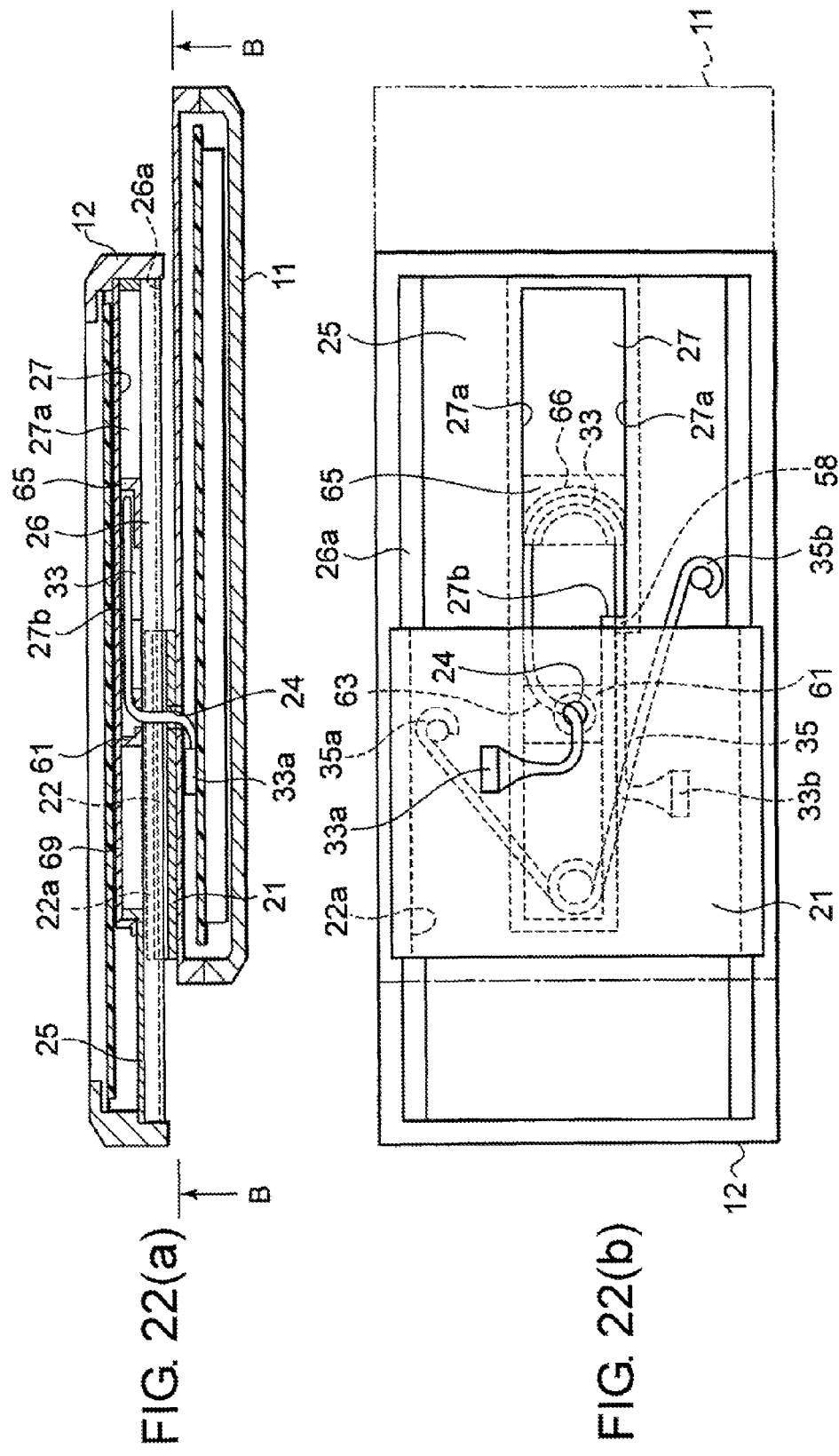
FIG. 22(a) is a vertical cross-sectional view schematically showing a sliding state of the cable in the slide type cellular phone taken along the longitudinal direction of the components, which corresponds to FIG. 18.
FIG. 22(b) is a view taken along line B-B of FIG. 22(a).

FIGS. 21(a) and 21(b) show a closed state in which the operation component case 11 and the display component case 12 are fully superimposed on each other, FIGS. 22(a) and 22(b) show a state during a sliding movement of the opening operation and the closing operation of the operation component case 11 and the display component case 12, and FIGS. 23(a) and 23(b) show an opened state in which the operation component case 11 and the display component case 12 are superimposed on each other only at the installation portion of the slider 21.

According to the fourth embodiment, in addition to the aforementioned advantageous effects of the first, second, and third embodiments, it is possible to reduce a load applied by curving the ultrafine coaxial cables 33 and to avoid damage to the ultrafine coaxial cables 33 with higher reliability.

According to aforementioned configurations of the first to fourth embodiments, a cable storage portion is formed in a single-layer space between opposed surfaces of a first component and a second component that are slidable relative to each other. A cable is drawn from a cable hole opened in the space between the opposed surfaces and stored in a state in which it is curved in a parallel direction. Therefore, the cable for connecting circuit boards in the first component and the second component can maintain the stored state by changing its curving portion in the single-layer space between the opposed surfaces depending upon relative movement caused by sliding. As a result, instead of a flexible printed wiring board, a wire such as a fine coaxial cable can be stored and can relatively be slid in a thin space between the opposed surfaces of the first component and the second component.

Although the present invention has been described with reference to some embodiments, the present invention is not limited to those embodiments. It is apparent to those skilled in the art that various modifications can be made in the configuration and details of the present invention within the scope of the present invention. For example, the present invention is applicable not only to a coaxial cable but also to a general power cable.

This application claims the benefit of priority from Japanese patent application No. 2009-042967, filed on Feb. 25, 2009, and Japanese patent application No. 2009-100385, filed on Apr. 16, 2009, the disclosure of which is incorporated herein in its entirety by reference.

Industrial Applicability

The present invention is widely applicable not only to a cellular phone, but also to a portable electronic terminal such as a PHS (Personal Handyphone System) or a PDA (Personal Data Assistance or Personal Digital Assistants).

The invention claimed is:

1. A cable storage structure of slide components, comprising a cable storage portion formed between opposed surfaces of a first component and a second component coupled to each other so as to be slidable relative to each other,
wherein the cable storage portion extends in a single-layer space parallel to the opposed surfaces and being capable of storing a given cable,
wherein the cable storage portion extends portions of the cable that have been drawn from cable holes opened in the respective opposed surfaces along the same sliding direction and stores the cable in a state in which the cable is curved in a plane direction between the opposed surfaces,
wherein a member storage portion for storing a biasing member extends in parallel and adjacent to the cable storage portion, and the biasing member biases both of the first component and the second component in the sliding direction for assisting a relative sliding operation, and
the cable is extended toward a far side of the biasing member in the sliding direction and stored in the cable storage portion, and the cable holes are opened on the far side of the biasing member.

2. The cable storage structure according to claim 1, wherein the cable storage portion has an inner side surface with which the cable drawn from the cable holes and curved between the opposed surfaces is brought into contact under pressure.

3. The cable storage structure according to claim 1, wherein the cable storage portion has a support portion formed on an opening edge that is opened so as to store the cable, and the support portion positions the cable within the cable storage portion.

4. The cable storage structure according to claim 1, wherein the cable storage portion has a slide holding portion for holding, within the cable storage portion, a curving portion of the cable that has been drawn from each of the cable holes and curved between the opposed surfaces, the slide holding portion sliding in the sliding direction along with the curving portion.

5. The cable storage structure according to claim 1, wherein the slide holding portion has a guide portion having an inner side surface with which the cable that has been drawn from each of the cable holes and curved between the opposed surfaces is brought into contact under pressure, and the guide portion guides the cable into the inner side surface.

6. The cable storage structure according to claim 1, wherein at least the cable storage portion is produced by forming a metal material.

7. The cable storage structure according to claim 1, wherein at least the cable storage portion is produced by pressing a sheet metal.

8. The cable storage structure according to claim 7, wherein the cable storage portion has a support portion extending in a form of a flange at an end of the inner side surface for positioning the cable within the cable storage portion, and
the support portion is produced by pressing a sheet metal and jointed to the end of the inner side surface of the cable storage portion.

9. The cable storage structure according to claim 1, wherein at least the cable storage portion is produced by molding a magnesium material.

10. The cable storage structure according to claim 1, wherein at least the cable storage portion is produced by forming a resin material.

11. A slide unit comprising a first component and a second component coupled to each other so as to be slidable relative to each other,
wherein a cable storage portion is formed between opposed surfaces of the first component and the second component so as to extend in a single-layer space parallel to the opposed surfaces and to be capable of storing a given cable,
wherein the cable storage portion extends portions of the cable that have been drawn from cable holes opened in the respective opposed surfaces along the same sliding direction and stores the cable in a state in which the cable is curved in a plane direction between the opposed surfaces,
wherein a member storage portion for storing a biasing member extends in parallel and adjacent to the cable storage portion, and the biasing member biases both of the first component and the second component in the sliding direction for assisting a relative sliding operation, and
the cable is extended toward a far side of the biasing member in the sliding direction and stored in the cable storage portion, and the cable holes are opened on the far side of the biasing member.

12. The slide unit according to claim 11, wherein the cable storage portion has an inner side surface with which the cable drawn from the cable holes and curved between the opposed surfaces is brought into contact under pressure.

13. The slide unit according to claim 11, wherein the cable storage portion has a support portion formed on an opening edge that is opened so as to store the cable, and the support portion positions the cable within the cable storage portion.

14. The slide unit according to claim 11, wherein the cable storage portion has a slide holding portion for holding, within the cable storage portion, a curving portion of the cable that has been drawn from each of the cable holes and curved between the opposed surfaces, the slide holding portion sliding in the sliding direction along with the curving portion.

15. The slide unit according to claim 11, wherein the slide holding portion has a guide portion having an inner side surface with which the cable that has been drawn from each of the cable holes and curved between the opposed surfaces is brought into contact under pressure, and the guide portion guides the cable into the inner side surface.

16. An electronic device comprising a first component and a second component coupled to each other so as to be slidable relative to each other, the first component and the second component storing circuit boards that are conductively connected via a cable,
- wherein a cable storage portion is formed between opposed surfaces of the first component and the second component so as to extend in a single-layer space parallel to the opposed surfaces and to be capable of storing the cable,
- wherein the cable storage portion extends portions of the cable that have been drawn from cable holes opened in the respective opposed surfaces along the same sliding direction and stores the cable in a state in which the cable is curved in a plane direction between the opposed surfaces,
- wherein a member storage portion for storing a biasing member extends in parallel and adjacent to the cable storage portion, and the biasing member biases both of the first component and the second component in the sliding direction for assisting a relative sliding operation, and
- the cable is extended toward a far side of the biasing member in the sliding direction and stored in the cable storage portion, and the cable holes are opened on the far side of the biasing member.

17. The electronic device according to claim 16, wherein the cable storage portion has an inner side surface with which the cable drawn from the cable holes and curved between the opposed surfaces is brought into contact under pressure.

18. The electronic device according to claim 16, wherein the cable storage portion has a support portion formed on an opening edge that is opened so as to store the cable, and the support portion positions the cable within the cable storage portion.

19. The electronic device according to claim 16, wherein the cable storage portion has a slide holding portion for holding, within the cable storage portion, a curving portion of the cable that has been drawn from each of the cable holes and curved between the opposed surfaces, the slide holding portion sliding in the sliding direction along with the curving portion.

20. The electronic device according to claim 16, wherein the slide holding portion has a guide portion having an inner side surface with which the cable that has been drawn from each of the cable holes and curved between the opposed surfaces is brought into contact under pressure, and the guide portion guides the cable into the inner side surface.

21. The electronic device according to claim 16, wherein a coaxial cable is used as the cable to conductively connect the circuit boards of the first component and the second component to each other.

22. A cable storage method comprising:
- forming a cable storage portion formed between opposed surfaces of a first component and a second component coupled to each other so as to be slidable relative to each other, the cable storage portion extending in a single-layer space parallel to the opposed surfaces and being capable of storing a given cable;
- drawing the cable from cable holes opened in the opposed surfaces and extending the cable along the same sliding direction; and
- curving the cable in a plane direction between the opposed surfaces,
- wherein a member storage portion for storing a biasing member extends in parallel and adjacent to the cable storage portion, and the biasing member biases both of the first component and the second component in the sliding direction for assisting a relative sliding operation, and
- the cable is extended toward a far side of the biasing member in the sliding direction and stored in the cable storage portion, and the cable holes are opened on the far side of the biasing member.

23. The cable storage method according to claim 22, wherein the cable storage portion has an inner side surface with which the cable drawn from the cable holes and curved between the opposed surfaces is brought into contact under pressure.

24. The cable storage method according to claim 22, wherein the cable storage portion has a support portion formed on an opening edge that is opened so as to store the cable, and the support portion positions the cable within the cable storage portion.

25. The cable storage method according to claim 22, wherein the cable storage portion has a slide holding portion for holding, within the cable storage portion, a curving portion of the cable that has been drawn from each of the cable holes and curved between the opposed surfaces, the slide holding portion sliding in the sliding direction along with the curving portion.

26. The cable storage method according to claim 22, wherein the slide holding portion has a guide portion having an inner side surface with which the cable that has been drawn from each of the cable holes and curved between the opposed surfaces is brought into contact under pressure, and the guide portion guides the cable into the inner side surface.

27. The cable storage method according to claim 22, wherein at least the cable storage portion is produced by forming a metal material.

28. The cable storage method according to claim 22, wherein at least the cable storage portion is produced by pressing a sheet metal.

29. The cable storage method according to claim 28, wherein the cable storage portion has a support portion extending in a form of a flange at an end of the inner side surface for positioning the cable within the cable storage portion, and
- the support portion is produced by pressing a sheet metal and jointed to the end of the inner side surface of the cable storage portion.

30. The cable storage method according to claim 22, wherein at least the cable storage portion is produced by molding a magnesium material.

31. The cable storage method according to claim 22, wherein at least the cable storage portion is produced by forming a resin material.

* * * * *

UNITED STATES PATENT AND TRADEMARK OFFICE
CERTIFICATE OF CORRECTION

PATENT NO. : 8,830,684 B2  
APPLICATION NO. : 13/148838  
DATED : September 9, 2014  
INVENTOR(S) : Fumiyuki Kobayashi Page 1 of 1

It is certified that error appears in the above-identified patent and that said Letters Patent is hereby corrected as shown below:

On the Title Page 2, Column 1 - Foreign Patent Documents, Line 4: Delete "200/171443" and insert -- 2001171443 --

In the Specification

Column 10, Line 60: Delete "14(h)" and insert -- 14(b) --

Column 10, Line 60: Delete "15(h)." and insert -- 15(b). --

Signed and Sealed this
Twenty-fourth Day of February, 2015

Michelle K. Lee
*Deputy Director of the United States Patent and Trademark Office*